United States Patent
Shikii et al.

(10) Patent No.: US 11,194,405 B2
(45) Date of Patent: Dec. 7, 2021

(54) METHOD FOR CONTROLLING INFORMATION DISPLAY APPARATUS, AND INFORMATION DISPLAY APPARATUS

(71) Applicant: Panasonic Intellectual Property Corporation of America, Torrance, CA (US)

(72) Inventors: Shinichi Shikii, Nara (JP); Koichi Kusukame, Nara (JP); Shinji Uchida, Osaka (JP); Tatsuo Itoh, Osaka (JP); Aki Yoneda, Hyogo (JP); Nawatt Silawan, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/277,417

(22) Filed: Sep. 27, 2016

(65) Prior Publication Data

US 2017/0102783 A1 Apr. 13, 2017

Related U.S. Application Data

(60) Provisional application No. 62/238,866, filed on Oct. 8, 2015.

(30) Foreign Application Priority Data

May 13, 2016 (JP) .............................. JP2016-097491

(51) Int. Cl.
*G06T 7/00* (2017.01)
*G06F 3/03* (2006.01)
(Continued)

(52) U.S. Cl.
CPC ............ *G06F 3/0304* (2013.01); *G06F 3/012* (2013.01); *G06F 3/013* (2013.01); *G06F 3/0484* (2013.01);
(Continued)

(58) Field of Classification Search
CPC . G06F 3/013; G06F 3/14; G06F 3/012; G06F 3/0482; G06F 3/017; G06F 3/0481;
(Continued)

(56) References Cited

U.S. PATENT DOCUMENTS 9,706,040 B2 * 7/2017 Kadirvel ............ H04M 1/72427
9,928,432 B1 * 3/2018 Sathyanarayana ..... H04N 5/247
(Continued)

FOREIGN PATENT DOCUMENTS

CN 104871531 A 8/2015
JP 2011-193275 A 9/2011
(Continued)

OTHER PUBLICATIONS

English Translation of Chinese Search Report dated Aug. 28, 2020 for the related Chinese Patent Application No. 201610806345.5.

*Primary Examiner* — Olga V Merkoulova

(74) *Attorney, Agent, or Firm* — Greenblum & Bernstein, P.L.C.

(57) ABSTRACT

In a method for controlling an information display apparatus that displays information on a display seen by a plurality of users, a feeling of a first user among the plurality of users is estimated on the basis of a physical value obtained from a sensor, it is determined, using the obtained physical value or the estimated feeling, whether to display the estimated feeling, and the display is controlled in accordance with a result of the determination.

14 Claims, 18 Drawing Sheets

(51) Int. Cl.
 *G06F 3/01* (2006.01)
 *G06F 3/0484* (2013.01)
 *G06K 9/00* (2006.01)
(52) U.S. Cl.
 CPC .... *G06K 9/00845* (2013.01); *G06F 2203/011* (2013.01); *G09G 2354/00* (2013.01); *G09G 2380/10* (2013.01)
(58) Field of Classification Search
 CPC .... G06F 3/1454; G06F 3/04883; G06F 3/011; G06T 7/00
 See application file for complete search history.

(56) References Cited

U.S. PATENT DOCUMENTS

| | | | | |
|---|---|---|---|---|
| 10,246,014 | B2* | 4/2019 | Levkova | B60Q 9/00 |
| 10,891,468 | B2* | 1/2021 | Kim | G06K 9/6272 |
| 2003/0066071 | A1* | 4/2003 | Gutta | H04N 7/163 |
| | | | | 725/10 |
| 2007/0150281 | A1* | 6/2007 | Hoff | G06Q 30/02 |
| | | | | 704/270 |
| 2008/0117323 | A1* | 5/2008 | Sakamoto | G06F 3/011 |
| | | | | 348/333.01 |
| 2011/0153341 | A1* | 6/2011 | Diaz-Cortes | G16H 10/60 |
| | | | | 705/2 |
| 2013/0121591 | A1 | 5/2013 | Hill | |
| 2013/0345568 | A1* | 12/2013 | Mestha | A61B 5/02405 |
| | | | | 600/473 |
| 2015/0078632 | A1* | 3/2015 | Hachisuka | G06K 9/00308 |
| | | | | 382/118 |
| 2015/0324634 | A1* | 11/2015 | Brosens-Kessels | |
| | | | | G06K 9/00771 |
| | | | | 382/103 |
| 2015/0358594 | A1* | 12/2015 | Marshall | G06F 3/013 |
| | | | | 345/419 |
| 2015/0378433 | A1* | 12/2015 | Savastinuk | G06K 9/00255 |
| | | | | 345/156 |
| 2016/0131905 | A1* | 5/2016 | Takahashi | G02B 27/0176 |
| | | | | 345/8 |
| 2016/0182955 | A1* | 6/2016 | Klappert | H04N 21/44204 |
| | | | | 725/14 |
| 2017/0064363 | A1* | 3/2017 | Wexler | G06K 9/00255 |
| 2017/0185827 | A1* | 6/2017 | Yamaya | G10L 25/78 |
| 2018/0330152 | A1* | 11/2018 | Mittelstaedt | G06K 9/00261 |

FOREIGN PATENT DOCUMENTS

| | | |
|---|---|---|
| JP | 2012-223457 A | 11/2012 |
| JP | 2013-216241 | 10/2013 |

* cited by examiner

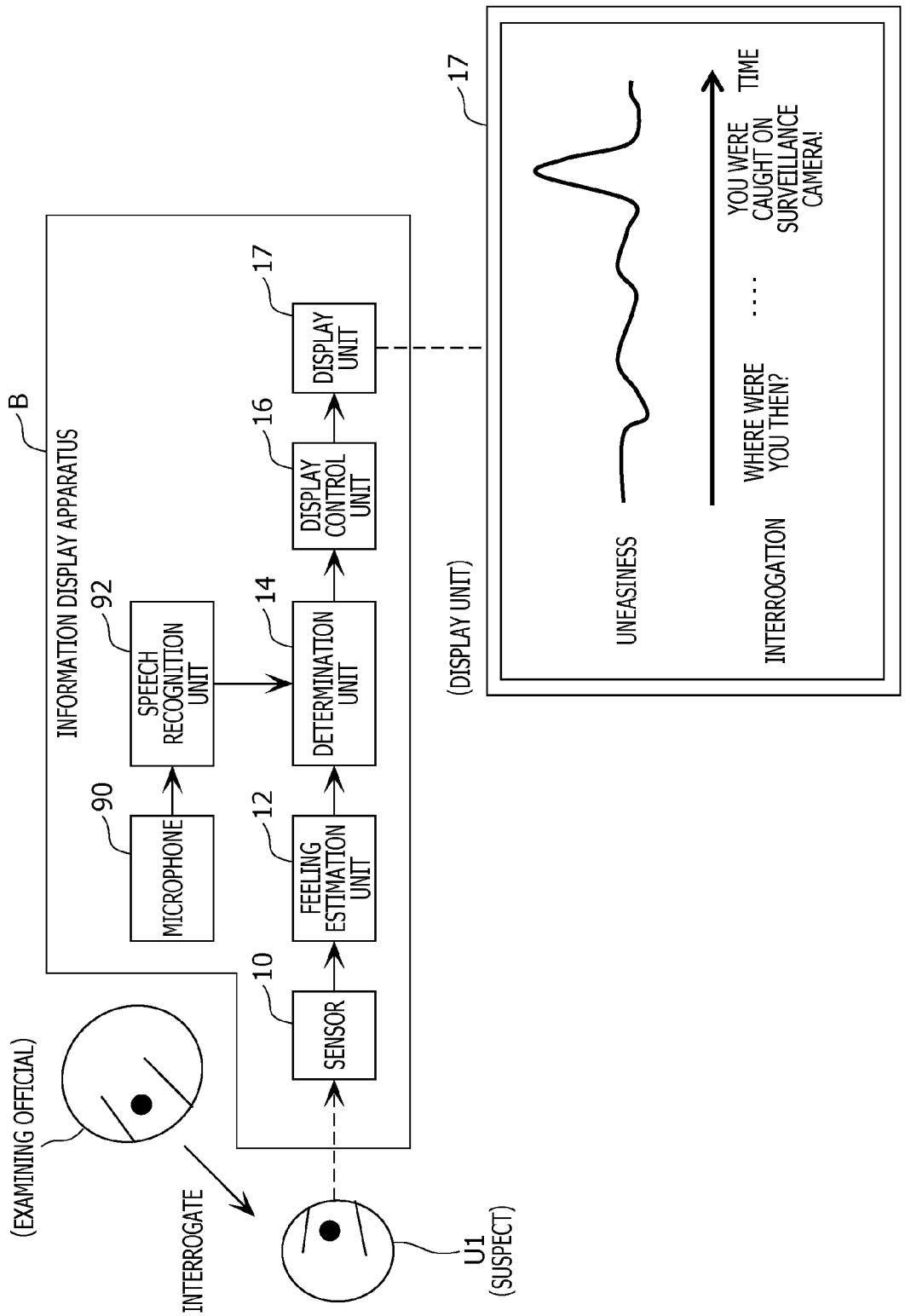

ns and the information display apparatus.

METHOD FOR CONTROLLING INFORMATION DISPLAY APPARATUS, AND INFORMATION DISPLAY APPARATUS

BACKGROUND

1. Technical Field

The present disclosure relates to a method for controlling an information display apparatus and the information display apparatus.

2. Description of the Related Art

Apparatuses that estimate persons' feelings and displays the estimated feelings have been disclosed (e.g., refer to Japanese Unexamined Patent Application Publication No. 2013-216241).

SUMMARY

In one general aspect, the techniques disclosed here feature a method for controlling an information display apparatus that displays information on a display seen by a plurality of users. The method includes estimating a feeling of a first user among the plurality of users on the basis of a physical value obtained from a sensor, determining, using the obtained physical value or the estimated feeling, whether to display the estimated feeling, and controlling the display in accordance with a result of the determining.

According to the method for controlling an information display apparatus in the present disclosure, an estimated feeling can be displayed more appropriately.

It should be noted that general or specific embodiments may be implemented as a system, a method, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a block diagram illustrating functional blocks of a fifth example of the information display apparatus according to the fourth embodiment.

DETAILED DESCRIPTION (Knowledge Underlying Present Disclosure)

Figure 1:
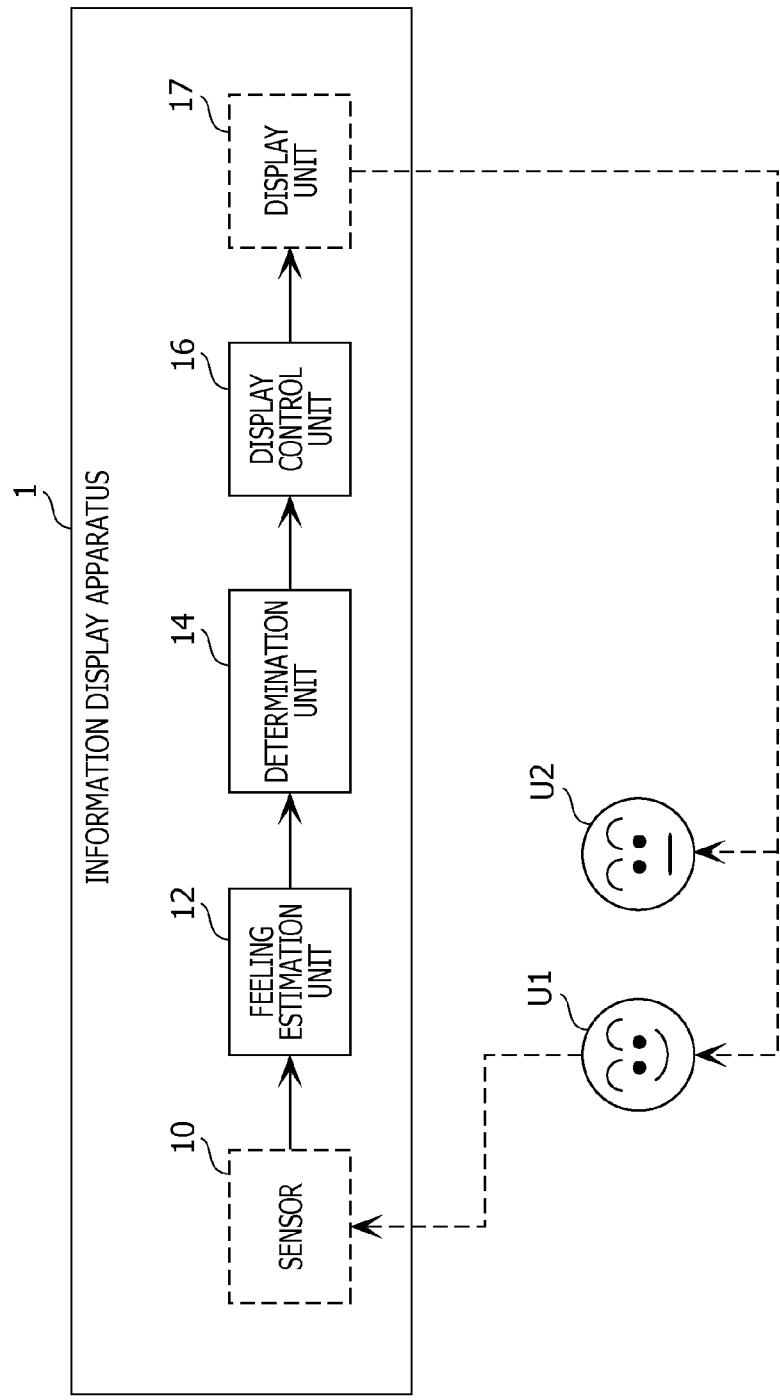
FIG. 1 is a block diagram illustrating functional blocks of an information display apparatus according to a first embodiment.

If the apparatus disclosed in Japanese Unexamined Patent Application Publication No. 2013-216241 estimates and displays a subject's feeling, a plurality of persons including the subject can see the feeling displayed by the apparatus. Depending on the displayed feeling, therefore, the subject might be embarrassed. If the subject feels a psychological stress such as embarrassment, the subject's feeling changes. In this case, the subject's feeling different from the feeling that should be estimated can be undesirably estimated.

The present disclosure, therefore, provides a method for controlling an information display apparatus that displays an estimated feeling more appropriately.

A method for controlling an information display apparatus according to an aspect of the present disclosure is a method for controlling an information display apparatus that displays information on a display seen by a plurality of users. The method includes estimating a feeling of a first user among the plurality of users on the basis of a physical value obtained from a sensor, determining, using the obtained physical value or the estimated feeling, whether to display the estimated feeling, and controlling the display in accordance with a result of the determining.

According to the above aspect, after estimating the first user's feeling, the information display apparatus determines whether to display the estimated feeling. The determination is made before the estimated feeling is displayed on the display in order to display or not to display the estimated feeling. As a result of the determination, if it is inappropriate to display the estimated feeling, the estimated feeling is not displayed. The information display apparatus, therefore, can display the estimated feeling more appropriately.

For example, in the determining, it may be determined whether the first user is looking at the display. In the controlling, (a) if it is determined that the first user is looking at the display, the estimated feeling need not be displayed, and (b) if it is determined that the first user is not looking at the display, the estimated feeling may be displayed.

According to the above aspect, the information display apparatus controls whether to display the estimated feeling in accordance with whether the first user is looking at the display. If the estimated feeling of the first user is displayed while the first user is looking at the display, the first user's feeling might change. If the first user's feeling changes, the first user's feeling estimated thereafter becomes different from the feeling that the first user has originally had or a feeling that the first user might have had, and a valid result of the estimation is not obtained. By not displaying the estimated feeling while the first user is looking at the display as described above, the first user's feeling does not change due to the displayed feeling.

For example, in the determining, a frequency according to the obtained physical value or the estimated feeling may be set as a display frequency. In the controlling, the estimated feeling may be displayed at the frequency set in the determining.

According to the above aspect, the information display apparatus changes the display frequency on the basis of the estimated feeling of the first user. As a result, the information display apparatus can intuitively display the estimated feeling of the first user.

For example, in the determining, a higher display frequency may be set as intensity of the estimated feeling becomes higher.

According to the above aspect, the information display apparatus changes the display frequency on the basis of the intensity of the estimated feeling of the first user. As a result, the information display apparatus can display the estimated feeling of the first user more intuitively.

For example, in the determining, it may be determined whether the estimated feeling is a feeling determined in advance not to be displayed on the display. In the controlling, the feeling determined in advance not to be displayed on the display need not be displayed.

According to the above aspect, since the estimated feeling of the first user is not displayed when the estimated feeling is the feeling determined in advance not to be displayed, the information display apparatus does not display an inappropriate feeling.

For example, in the determining, the estimated feeling may be displayed in advance to the first user, and an instruction by the first user, as to whether to display the feeling displayed in advance to the first user, is received. In the controlling, the display may be controlled in accordance with the instruction by the first user.

According to the above aspect, the information display apparatus controls, in accordance with the instruction issued by the first user, whether to display the estimated feeling of the first user. A feeling that the first user does not want to display, therefore, is not displayed.

For example, in the determining, it may be determined whether or not the number of users included in an image obtained by a camera as the sensor is three or more. If it is determined that the number of users included in the image is three or more, the estimated feeling may be displayed.

According to the above aspect, the information display apparatus can display the estimated feeling of the first user in a way that the first user is not identified as one who has the estimated feeling, that is, anonymously. When the first user is not identified as the one who has the estimated feeling, a psychological stress on the first user, such as embarrassment, is relatively small when the estimated feeling is displayed.

For example, in the estimating, arousal, surprise, pleasure, comfort, carefreeness, drowsiness, boredom, sadness, disgust, irritation, anger, scare, or calmness may be estimated as the feeling of the first user on the basis of an image including a face of the first user obtained by a camera as the sensor.

According to the above aspect, the information display apparatus can estimate the first user's feeling more specifically.

For example, the first user may be a driver of a vehicle. The plurality of users other than the first user need not be passengers of the vehicle. In the estimating, irritation or anger of the driver may be estimated.

According to the above aspect, the information display apparatus can display the feeling of the first user in the vehicle to a user who is not a passenger of the vehicle.

For example, the first user may be a user of a toilet located inside the toilet. The plurality of users other than the first user may be persons waiting outside the toilet to use the toilet. In the estimating, discomfort or carefreeness of the user may be estimated.

According to the above aspect, the information display apparatus can display the feeling of the first user who is using the toilet inside the toilet to a user who is waiting outside the toilet to use the toilet.

For example, the first user may be a person waiting outside a toilet to use the toilet. The plurality of users other than the first user may be users of toilets located inside the toilets. In the estimating, discomfort or irritation of the person waiting outside the toilet may be estimated.

According to the above aspect, the information display apparatus can display the feeling of the first user who is waiting outside the toilet to use the toilet to a user who is using the toilet inside the toilet. For example, at least one of the estimating, the determining and the controlling may be performed by a processor.

In addition, an information display apparatus according to an aspect of the present disclosure is an information display apparatus that displays information on a display seen by a plurality of users. The information display apparatus includes a feeling estimator that estimates a feeling of a first user among the plurality of users on the basis of a physical value obtained from a sensor, a determiner that determines, using the obtained physical value or the estimated feeling, whether to display the estimated feeling, and a display controller that controls the display in accordance with a result of the determination.

As a result, the same advantageous effect as above can be produced. For example, at least one of the feeling estimator, the determiner and the display controller may include a processor.

In addition, a recording medium according to an aspect of the present disclosure is non-transitory recording medium storing a program for controlling a computer that displays information on a display seen by a plurality of users. The program causing the computer to execute estimating a feeling of a first user among the plurality of users on the basis of a physical value obtained from a sensor, determining, using the obtained physical value or the estimated feeling, whether to display the estimated feeling and controlling the display in accordance with a result of the determining.

As a result, the same advantageous effect as above can be produced.

It should be noted that these general or specific aspects may be implemented as a system, a method, an integrated circuit, a computer program, a computer-readable storage medium such as a CD-ROM, or any selective combination thereof.

Embodiments will be specifically described hereinafter with reference to the drawings.

The following embodiments are general or specific examples. Values, shapes, materials, components, arrangement positions and connection modes of the components, steps, the order of the steps, and the like are examples, and do not limit the present disclosure. Among the components described in the following embodiments, ones not described in the independent claims, which define broadest concepts, will be described as arbitrary components.

First Embodiment

In a first embodiment, an information display apparatus that displays an estimated feeling more appropriately will be described. More specifically, the information display apparatus estimates and displays a subject's feeling without affecting the subject's feeling in order to achieve continuous estimation of the subject's feeling.

FIG. 1 is a block diagram illustrating functional blocks of an information display apparatus 1 according to the present embodiment.

As illustrated in FIG. 1, the information display apparatus 1 includes a feeling estimation unit 12, a determination unit 14, and a display control unit 16. The information display apparatus 1 may also include a sensor 10 and a display unit 17. A plurality of users can see the display unit 17. Although users U1 and U2 are illustrated in FIG. 1 as the plurality of users, there may be three or more users.

The sensor 10 is an example of a sensor used by the feeling estimation unit 12 and, more specifically, a camera that captures an image using visible light or infrared light, a heart rate monitor, a sphygmomanometer, or the like. The sensor 10 need not necessarily be included in the information display apparatus 1.

The feeling estimation unit 12 is a processing unit that estimates the feeling of the user U1, who is the subject among the plurality of users, on the basis of a physical value obtained by the sensor 10. Although the sensor used by the feeling estimation unit 12 is the sensor 10 here, the sensor used by the feeling estimation unit 12 is not limited to the sensor 10. The feeling estimation unit 12 may obtain a physical value from a sensor outside the information display apparatus 1. The feeling estimation unit 12 can estimate the feeling of the user U1 by, for example, analyzing the expression of the user U1 in an image as a physical value obtained by a camera as a sensor. A known method may be used for analyzing an expression (more specifically, relative positions of feature points such as the eyes, mouth, and nose) and obtaining a feeling.

The determination unit 14 is a processing unit that determines, using a physical value obtained by the sensor 10 or a feeling estimated by the feeling estimation unit 12, whether to display an estimated feeling. The determination unit 14 may determine a frequency at which the display unit 17 displays a feeling in accordance with a physical value obtained by the sensor 10 or a feeling estimated by the feeling estimation unit 12. As the intensity of a feeling estimated by the feeling estimation unit 12 becomes higher, the determination unit 14 may set a higher frequency at which the display unit 17 displays the feeling. The determination unit 14 may also determine whether a feeling estimated by the feeling estimation unit 12 is a feeling determined not to be displayed on the display unit 17. In this case, the display control unit 16 and the display unit 17 do not display the feeling.

The display control unit 16 is a processing unit that determines whether to display an estimated feeling on the display unit 17 in accordance with a result of a determination made by the determination unit 14.

The display unit 17 displays information in accordance with control performed by the display control unit 16. The display unit 17 is, for example, a liquid crystal display.

The feeling estimation unit 12, the determination unit 14, and/or the display control unit 16 may be achieved as software by a processor (not illustrated) that is included in the information display apparatus 1 and that executes a program or may be achieved as hardware using a dedicated circuit. It is assumed that information used by these components to achieve their respective processes is stored in a memory (not illustrated) or a storage (not illustrated) included in the information display apparatus 1.

Figure 2:
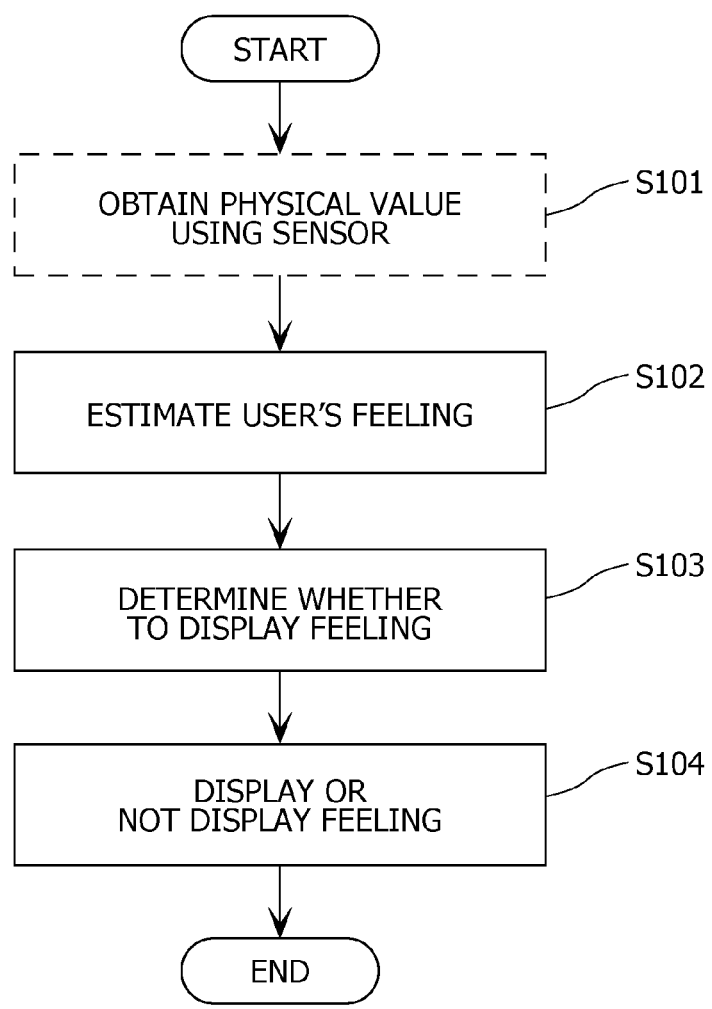
FIG. 2 is a flowchart illustrating a method for controlling the information display apparatus according to the first embodiment.

FIG. 2 is a flowchart illustrating a method for controlling the information display apparatus 1 according to the present embodiment.

In step S101, the sensor 10 obtains a physical value. A sensor outside the information display apparatus 1 may be used instead of the sensor 10, and, in this case, the information display apparatus 1 obtains a physical value obtained by the external sensor in this step.

In step S102, the feeling estimation unit 12 estimates the feeling of the user U1 on the basis of the physical value obtained by the sensor 10 (or the external sensor).

In step S103, the determination unit 14 determines whether to display the estimated feeling using the physical value obtained by the sensor 10 (or the external sensor) or the feeling estimated by the feeling estimation unit 12. For example, the determination unit 14 identifies the direction of the eyes of the user U1 or determines whether the feeling estimated by the feeling estimation unit 12 is a certain feeling.

In step S104, the display control unit 16 displays or does not display the feeling estimated in step S102 by the feeling estimation unit 12 on the display unit 17 in accordance with a result of the determination made by the determination unit 14.

With respect to the determination made by the determination unit 14, the feeling estimated by the feeling estimation unit 12 may be displayed to the user U1 in advance, and the user U1 may issue an instruction as to whether to display the feeling on the display unit 17. The determination unit 14 may receive the instruction issued by the user U1. In this case, the display control unit 16 controls the display unit 17 in accordance with the instruction issued by the user U1 in response to the feeling displayed in advance.

Alternatively, in the determination made by the determination unit 14, the number of users included in an image captured by the camera as a sensor may be identified. If there are three or more users, the display control unit 16 may permit the display unit 17 to display the estimated feeling.

As a result of the above process, the information display apparatus 1 displays the estimated feeling more appropriately. More specifically, the information display apparatus 1 can estimate and display a subject's feeling without affecting the subject's feeling in order to achieve continuous estimation of the subject's feeling.

As described above, the information display apparatus 1 according to the present embodiment estimates the first user's feeling and then determines whether to display the estimated feeling. The determination is made before the display unit 17 displays the estimated feeling in order to control whether to display the estimated feeling. As a result of the determination, if it is inappropriate to display the estimated feeling, the estimated feeling is not displayed. The information display apparatus 1, therefore, can display the estimated feeling more appropriately.

In the determination made by the determination unit 14, it may be determined whether to display an estimated feeling on the basis of a physical value obtained by another sensor or for another reason.

Second Embodiment

In a second embodiment, an information display apparatus that displays an estimated feeling more appropriately will be specifically described.

Figure 3:
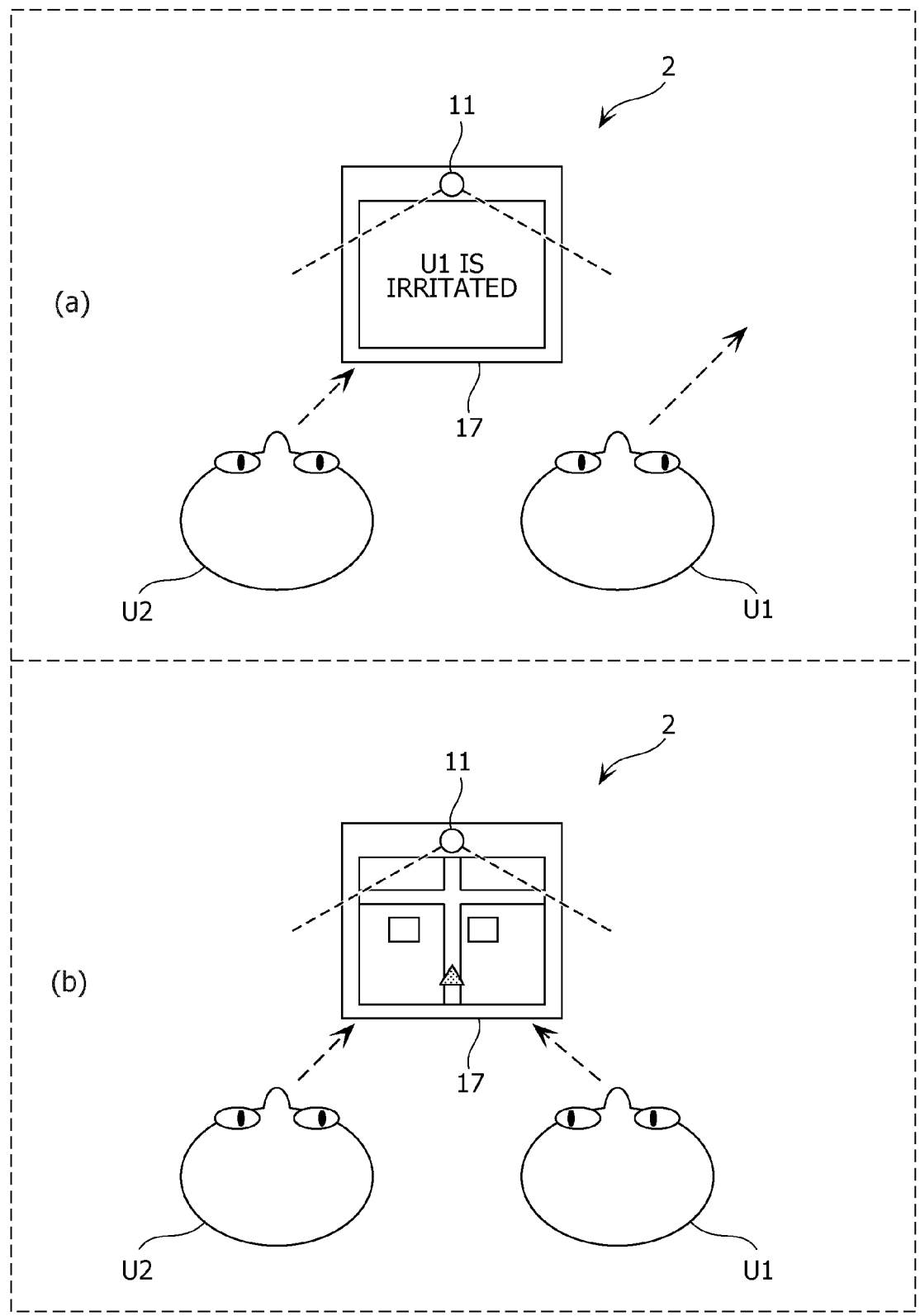
FIG. 3 is a diagram illustrating a scene in which an information display apparatus is used according to a second embodiment.

FIG. 3 is a diagram illustrating a scene in which an information display apparatus 2 is used according to the present embodiment.

As illustrated in FIG. 3, the user U1 who is a driver and the user U2 who is a passenger can see the display unit 17 of the information display apparatus 2, which is installed in a vehicle (automobile) as a navigation apparatus, in the vehicle.

The information display apparatus 2 estimates the feeling of the user U1 and displays the estimated feeling. If the information display apparatus 2 constantly displays the feeling of the user U1, however, the user U1 sees the user U2 watching an estimated feeling thereof. As a result, the user U1 might feel a psychological stress such as embarrassment and the feeling of the user U1 might change, which undesirably makes it difficult to appropriately estimate the feeling of the user U1.

The information display apparatus 2, therefore, determines whether to display an estimated feeling on the basis of the direction of the eyes of the user U1. More specifically, while the user U1 is not looking at the display unit 17 of the information display apparatus 2 (FIG. 3(*a*)), an estimated feeling is displayed. While the user U1 is looking at the display unit 17 of the information display apparatus 2 (FIG. 3(*b*)), an estimated feeling is not displayed. In this case, the user U1 does not see the user U2 watching an estimated feeling thereof. As a result, the information display apparatus 2 can appropriately display an estimated feeling of the user U1 without affecting the feeling of the user U1.

Functions of the information display apparatus 2 and a process performed by the information display apparatus 2 will be described in detail hereinafter.

Figure 4:
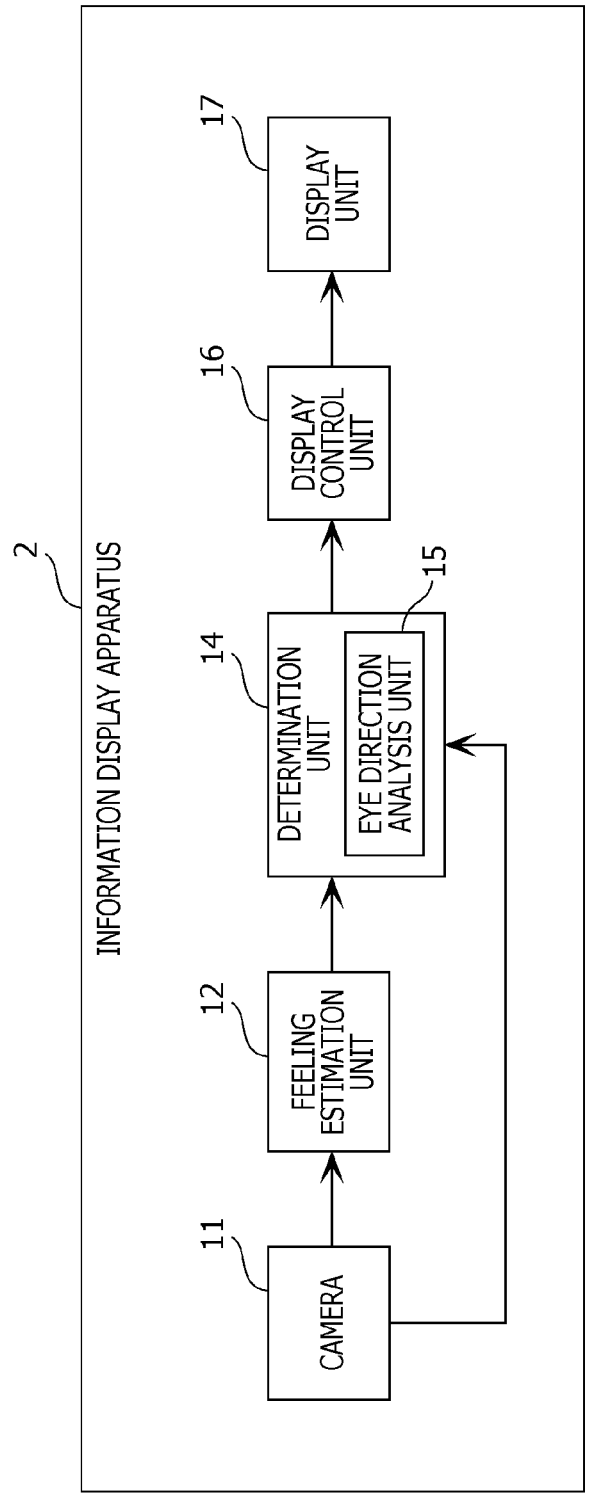
FIG. 4 is a block diagram illustrating functional blocks of the information display apparatus according to the second embodiment.

FIG. 4 is a block diagram illustrating functional blocks of the information display apparatus 2 according to the present embodiment.

As illustrated in FIG. 4, the information display apparatus 2 includes a camera 11, the feeling estimation unit 12, the determination unit 14, the display control unit 16, and the display unit 17. The same components as in the first embodiment are given the same reference numerals, and detailed description thereof might be omitted.

The camera 11 is a visible light camera or an infrared camera that captures an image of the face of the user U1. The camera 11 functions as a sensor that obtains an image as a physical value.

The feeling estimation unit 12 is a processing unit that estimates the feeling of the user U1 on the basis of the expression of the user U1 in an image obtained by the camera 11 as a sensor. The user U1 can experience various feelings, and a known method may be employed to estimate the feeling of the user U1. The feeling may be a positive feeling or a negative feeling, for example, and may be identified on the basis of an index indicating a degree of the positivity (or negativity) of the feeling. Here, a positive feeling is a lively, vivacious feeling and, more specifically, indicates an aroused, excited, or happy state. A negative feeling is a feeling opposite a positive feeling and indicates a languid, passive state.

A feeling may be represented on a two-dimensional model of feelings (e.g., Russel's circumplex model) defined by a type of feeling (e.g., arousal, surprise, pleasure, comfort, carefreeness, drowsiness, boredom, sadness, disgust, irritation, anger, scare, or calmness) and the intensity of feeling.

The determination unit 14 is a processing unit that determines whether to display an estimated feeling on the basis of the direction of the eyes of the user U1 in an image obtained, as a physical value, by the camera 11 as a sensor. The determination unit 14 includes an eye direction analysis section 15 that analyzes the direction of the eyes of the user U1 in an image obtained by the camera 11. The direction of the eyes can be analyzed using a known method on the basis of the direction of the face of the user U1 and the position of the eyes in an image.

In the determination, the determination unit 14 obtains the direction of the eyes of the user U1, which is a result of the analysis conducted by the eye direction analysis unit 15, and determines whether the eyes of the user U1 are directed to the display unit 17, in order to determine whether or not the user U1 is looking at the display unit 17 or a nearby area. Whether the eyes of the user U1 are directed to the display unit 17 can be determined using a known method on the basis of information indicating the position and direction of the face of the user U1 and the position and direction of the display unit 17.

The display control unit 16 determines whether to display a feeling estimated by the feeling estimation unit 12 on the display unit 17 in accordance with a result of the determination made by the determination unit 14. More specifically, (a) if the determination unit 14 determines that the user U1 is looking at the display unit 17, the display control unit 16 generates control information for inhibiting the display unit 17 from displaying a feeling. On the other hand, (b) if the determination unit 14 determines that the user U1 is not looking at the display unit 17, the display control unit 16 generates control information for permitting the display unit 17 to display a feeling. The display control unit 16 then controls the display unit 17 in accordance with the generated control information.

A method for controlling the information display apparatus 2 will be described hereinafter.

Figure 5:
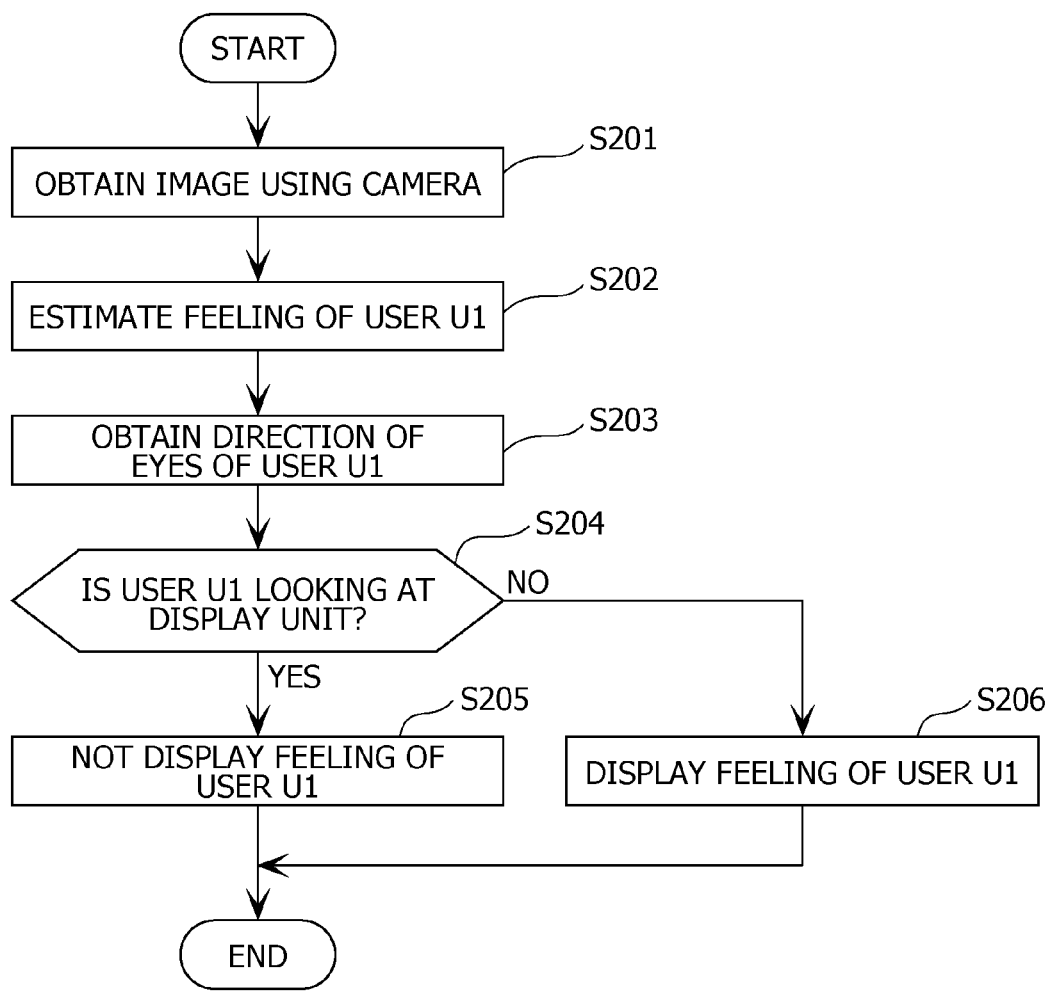
FIG. 5 is a flowchart illustrating a method for controlling the information display apparatus according to the second embodiment.

FIG. 5 is a flowchart illustrating the method for controlling the information display apparatus 2 according to the present embodiment.

In step S201, the camera 11 obtains an image.

In step S202, the feeling estimation unit 12 estimates the feeling of the user U1 on the basis of the image obtained in step S201.

In step S203, the eye direction analysis unit 15 obtains the direction of the eyes of the user U1 on the basis of the image obtained in step S201.

In step S204, the determination unit 14 determines whether the user U1 is looking at the display unit 17 or a nearby area on the basis of the direction of the eyes of the user U1 obtained in step S203. If the determination unit 14 determines that the user U1 is looking at the display unit 17 (YES in step S204), the process proceeds to step S205, and if not (NO in step S204), the process proceeds to step S206.

In step S205, the display control unit 16 inhibits the display unit 17 from displaying the estimated feeling of the user U1. At this time, the display control unit 16 may display another piece of information (e.g., an image of a map around a current location) on the display unit 17 (refer to FIG. 3(b)).

In step S206, the display control unit 16 permits the display unit 17 to display the estimated feeling of the user U1 (refer to FIG. 3(a)).

As a result of the above process, the information display apparatus 2 appropriately displays the estimated feeling of the user U1 without affecting the feeling of the user U1 by hiding the displayed feeling of the user U1 from the user U1.

A specific method for estimating a feeling used by the feeling estimation unit 12 may be as follows. If the camera 11 is used as a sensor, the feeling estimation unit 12 detects a pulse from an image obtained by the camera 11 or variation in a green component of the image and obtains a power spectrum of a frequency component of R-R intervals (RRIs) of the detected pulse from temporal variation in the RRIs. The feeling estimation unit 12 then determines whether the user U1 is relaxed or tense on the basis of a ratio (LF/HF) of a low-frequency (LF) component (e.g., 0.05 to 0.15 Hz) to a high-frequency (HF) component (e.g., 0.15 to 0.4 Hz) in the power spectrum of the frequency component. In addition, a degree of drowsiness can be determined by measuring, in an image obtained by the camera 11, how widely the eyes are open or a period of time for which the eyes are open in unit time. If a thermal camera is used as a sensor, the feeling estimation unit 12 can detect tension on the basis of peripheral skin temperature. When a person is tense, the peripheral skin temperature decreases.

The physical value obtained by the sensor is biological information such as a heart rate, a heartbeat waveform, a pulse wave, a pulse waveform, the LF/HF, a degree of opening of the eyes, pupil diameter, blood flow volume, oxygen saturation, complexion, gaze, the amount of perspiration, a respiration rate, respiratory volume, skin temperature, or body temperature.

A specific method for determining whether to display an estimated feeling used by the display control unit 16 may be as follows. If the camera 11 is used as a sensor, the degree of opening of the eyes of the user U1 is detected from an image obtained by the camera 11. If the eyes have been closed for a certain period of time, for example, it may be determined that the user U1 has fallen asleep, and the display control unit 16 may display "drowsy" on the display unit 17. If an estimated feeling is a feeling determined in advance not to be displayed by the information display apparatus 2, the display control unit 16 may inhibit the display unit 17 from displaying the feeling. If an estimated feeling is one that the user U1 might not want to reveal, such as "bored", for example, the display control unit 16 may inhibit the display unit 17 from displaying the feeling. In addition, if the camera 11 is used as a sensor and an image obtained by the camera 11 includes a plurality of persons, the display unit 17 may display a feeling. In this case, a feeling to be displayed may be an average of feelings of the plurality of persons, or may be the feeling of a certain person(s) or any person(s).

The feeling estimation unit 12 may correct an estimated feeling. For example, the feeling estimation unit 12 may correct an estimated feeling on the basis of the amount of operation (an accelerator, brakes, or a steering wheel). More specifically, the feeling estimation unit 12 may correct the intensity of irritation in accordance with the frequency or a degree of a roaring start or a sudden braking. By increasing the intensity of irritation when the frequency or degree of a roaring start or a sudden braking increases, a driver recognizes his/her own irritation. The driver can then be more careful or slow down the vehicle to drive more safely or improve fuel efficiency. In addition, the feeling estimation unit 12 may correct the intensity of drowsiness in accordance with the driver's gripping force on the steering wheel or a gripping area (an area over which the driver's hands grip the steering wheel by a certain value of pressure or more). By increasing a drowsiness level when the gripping force or area decreases, the driver can be notified of a decrease in an arousal level earlier or aroused using a seatbelt or the like, which improves safety. In addition, the feeling estimation unit 12 may correct an estimated feeling in accordance with traffic around the vehicle or a distance to a vehicle ahead. If the traffic is heavy or the distance to a vehicle ahead is small, the intensity of irritation may be increased to prompt the driver to drive safely or use the brakes or the accelerator more carefully. The driver may of course move to a position at which a sufficient distance to a vehicle ahead can be secured.

Alternatively, the feeling estimation unit 12 may estimate a feeling on the basis of a change in the driver's expression after an inquiry to the driver or a response to an inquiry. If the driver makes an irrelevant response to the inquiry, for example, the feeling estimation unit 12 estimates that the driver is absentminded or drowsy. Alternatively, if the driver responds in a harsh tone or frowns, the feeling estimation unit 12 may estimate that the driver is irritated. The feeling estimation unit 12 may estimate a feeling on the basis of a slight change in expression (microexpression) or a steady change in expression. If there is no coherence in the driver's talking, the feeling estimation unit 12 may estimate that the driver is absentminded, even when no inquiry has been made.

In addition, the information display apparatus 2 may change, on the basis of an estimated feeling, a parking lot or a parking space to be displayed. If the driver is not uneasy, the information display apparatus 2 may display a parking lot or a parking space that is difficult to park. This is because some find it amusing to park in a difficult parking lot. A difficult parking space generally tends to be vacant. By displaying a difficult parking space for a person who does not worry about the difficulty of the parking space, a parking lot can be used more effectively.

In addition, the feeling estimation unit 12 may correct an estimated feeling on the basis of temperature, atmospheric pressure, noise, weather, brightness, or the like. More specifically, if the temperature is moderate, for example, an estimated feeling may be corrected in such a way as to emphasize pleasure. If the atmospheric pressure is low, an estimated feeling may be corrected in such a way as to emphasize discomfort. If the noise is relatively large, an estimated feeling may be corrected in such a way as to emphasize irritation. If the weather is good, an estimated feeling may be corrected in such a way as to emphasize pleasure. If the weather is bad, on the other hand, pleasure may be decreased. If the brightness is high, an estimated feeling may be corrected in such a way as to emphasize pleasure. Other types of correction, needless to say, may be performed.

In addition, the information display apparatus 2 may be achieved as an application on a smartphone or a personal computer (PC). In this case, if a certain feeling is detected while the application is being used, the smartphone or the PC may be inhibited from performing a certain operation. If it is estimated while the user U1 is using a communication application (a so-called "social networking service (SNS)" or the like) that the user U1 is irritated, for example, a posting button may be disabled. The button itself may be disabled, or another operation (or process) may replace an original operation of the button. In doing so, the user U1 does not post an emotional message and therefore does not impair friendship, regret, or is not condemned by other users. In addition, the user U1 does not hurt or bully anybody with an aggressive message.

In addition, the following becomes possible when a cloud computing is employed.

The information display apparatus 2 may display feelings of one or more nearby drives on a radar chart or the like. In this case, the user U1 can avoid an area in which there are many irritated persons. Alternatively, the information display apparatus 2 may upload feelings to a cloud server and control an accelerator or brakes in such a way as to slow down the vehicle in a place where there are many irritated persons. This is effective especially in automated driving. In addition, if the vehicle is approaching a dangerous or treacherous place, such as a snow-covered road, after feelings are uploaded to a cloud server, the information display apparatus 2 may lead the vehicle to a chain attachment area in order to achieve safer driving. In addition, the information display apparatus 2 may predict a future feeling of a driver on the basis of big data or navigation information uploaded to a cloud server and prevent the driver from having an inappropriate feeling. If the driver is approaching a place where the driver was irritated in the past, for example, the information display apparatus 2 may play back a song for appeasing the driver. Alternatively, the information display apparatus 2 may display, on the basis of guidance information provided by a navigation apparatus, a route that does not pass through a place where the driver was irritated in the past. Alternatively, the information display apparatus 2 may predict changes in the driver's feeling from a current position to a destination and suggest a route with which the driver is unlikely to be irritated, or may enable the driver to select a route with which the driver is unlikely to be irritated. As a result, the information display apparatus 2 can make the driver drive safely without irritation.

In addition, the information display apparatus 2 may display how many automated driving vehicles exist around the driver. The information may be used for determining whether to switch to automated driving. Alternatively, the information display apparatus 2 may learn a driving preference of an individual and, if it is estimated during automated driving that the driver is bored, suggest switching from the automated driving to manual driving. As a result, the driver can enjoy driving. Alternatively, the information display apparatus 2 may learn a driving preference of an individual and display the driver's favorite route. Although the driver is usually not aware or his/her favorite route, the driver realizes his/her favorite route in this case and enhances awareness of safety.

First Modification of Second Embodiment

In a first modification of the second embodiment, an information display apparatus according to another embodiment that displays an estimated feeling more appropriately will be specifically described.

Figure 6:
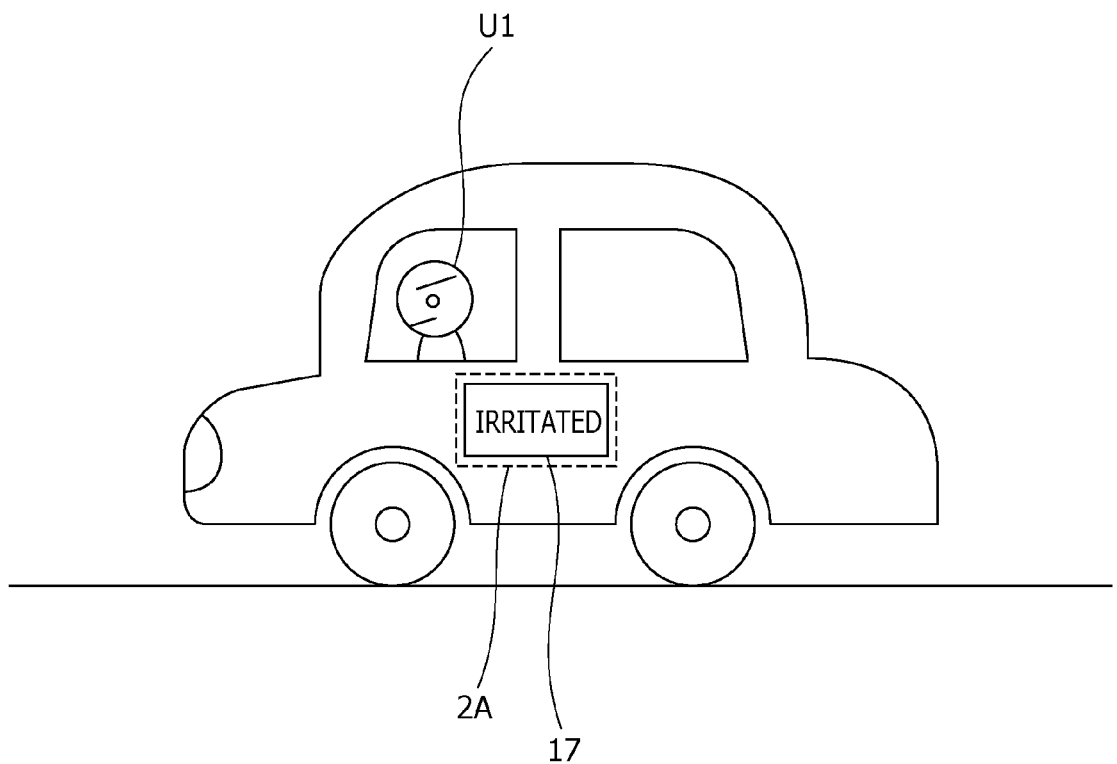
FIG. 6 is a diagram illustrating a scene in which an information display apparatus is used according to a first modification of the second embodiment.

FIG. 6 is a diagram illustrating a scene in which an information display apparatus 2A according to the present modification is used.

As illustrated in FIG. 6, for example, the information display apparatus 2A displays, outside the vehicle, the feeling of the user U1 driving a vehicle. That is, an estimated feeling of the user U1, who is the driver of the vehicle, can be displayed to another user (e.g., a driver of another vehicle or a pedestrian). Since the feeling of the user U1 is displayed to another user, another driver or a pedestrian can avoid approaching the vehicle of the user U1 for safety purposes, for example, if it is dangerous to approach the vehicle of the user U1.

Functions of the information display apparatus 2A and a process performed by the information display apparatus 2A will be described in detail hereinafter.

Figure 7:
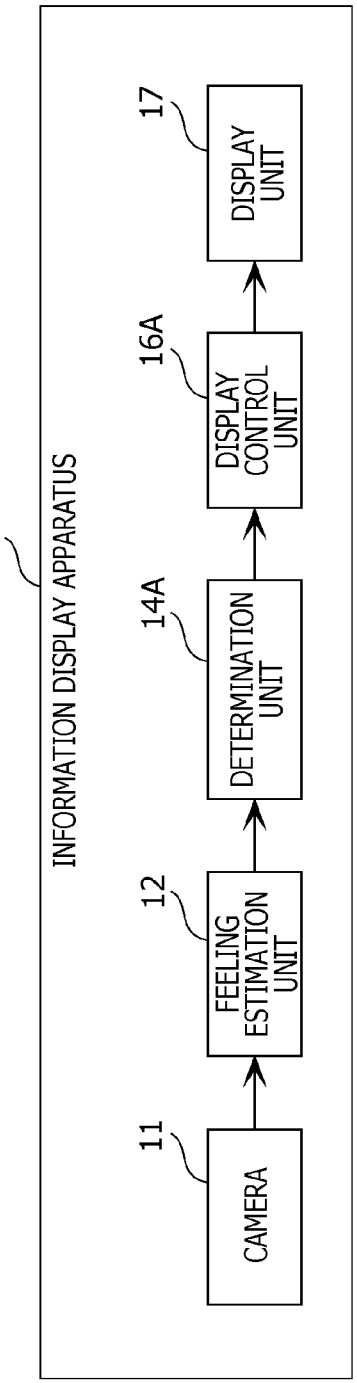
FIG. 7 is a block diagram illustrating functional blocks of the information display apparatus according to the first modification of the second embodiment.

FIG. 7 is a block diagram illustrating functional blocks of the information display apparatus 2A according to the present embodiment.

As illustrated in FIG. 7, the information display apparatus 2A includes the camera 11, the feeling estimation unit 12, a determination unit 14A, a display control unit 16A, and the display unit 17. The same components as those according to the first embodiment are given the same reference numerals, and detailed description thereof is omitted.

The feeling estimation unit 12 estimates the feeling of the user U1 along with the intensity of the feeling. For example, the feeling estimation unit 12 estimates a feeling such as a relatively high level of irritation or a relatively low level of comfort.

The determination unit 14A is a processing unit that sets, on the basis of the intensity of a feeling of the user U1 estimated by the feeling estimation unit 12, a period of time for which the estimated feeling is displayed. More specifically, the determination unit 14A sets, in accordance with the intensity of the feeling, an on time (on-duty time) and an off time (off-duty time) at a time when the display unit 17 periodically displays a feeling estimated by the feeling estimation unit 12 or a duty ratio. As the intensity of the estimated feeling becomes higher, for example, the length of the on time set by the determination unit 14A becomes longer.

The display control unit 16A is a processing unit that controls the display unit 17 that displays a feeling estimated by the feeling estimation unit 12 in accordance with a result of a determination made by the determination unit 14A. More specifically, the display control unit 16A controls the display unit 17 in accordance with the on time and the off time or the duty ratio set by the determination unit 14A.

A method for controlling the information display apparatus 2A will be described hereinafter.

Figure 8:
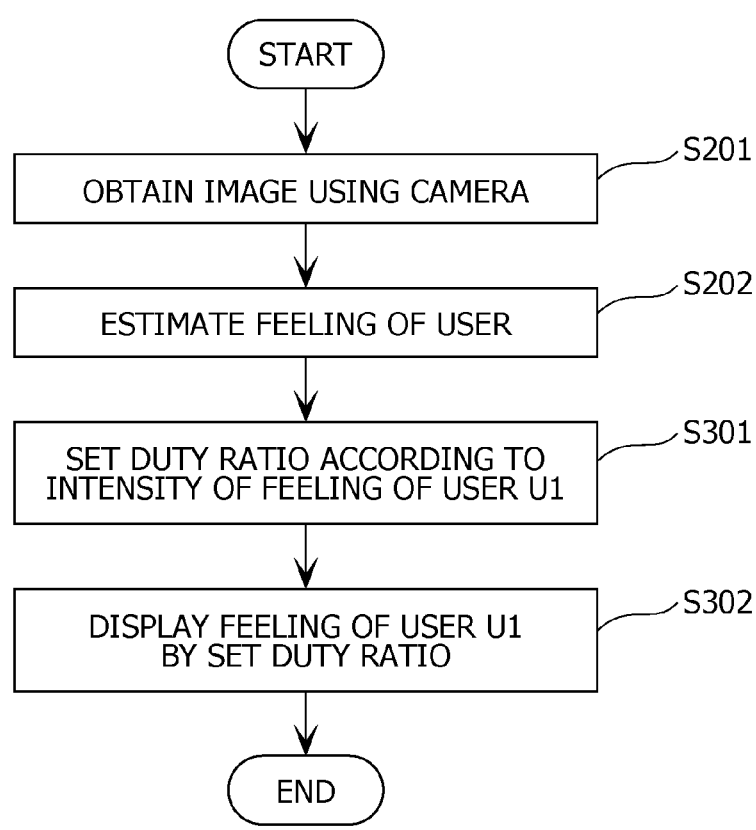
FIG. 8 is a flowchart illustrating a method for controlling the information display apparatus according to the first modification of the second embodiment.
Figure 9:
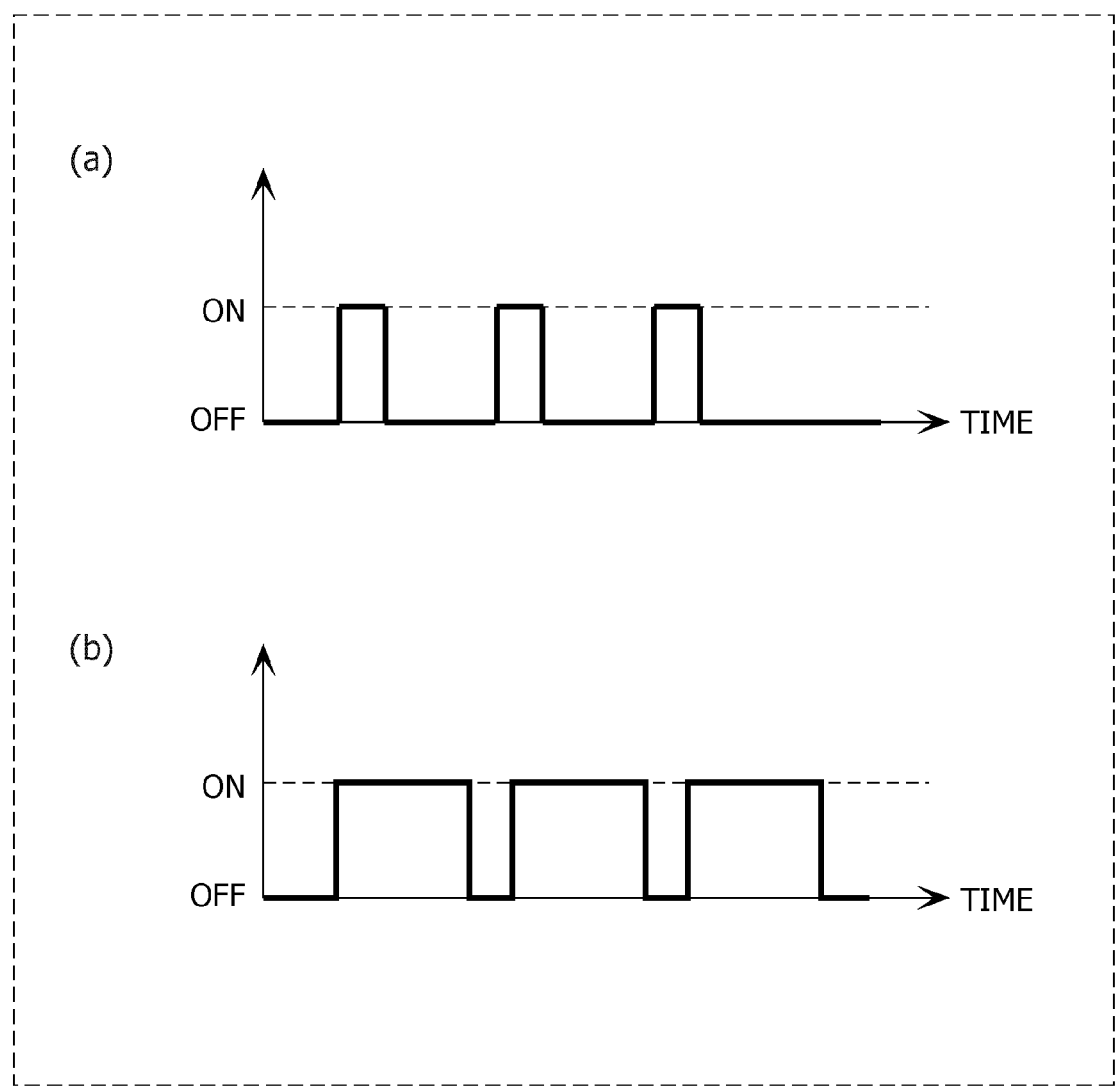
FIG. 9 is a diagram illustrating an example of a duty ratio used by the information display apparatus according to the first modification of the second embodiment.

FIG. 8 is a flowchart illustrating the method for controlling the information display apparatus 2A according to the present modification. FIG. 9 is a diagram illustrating an example of the duty ratio set by the information display apparatus 2A according to the present modification.

Steps S201 and S202 illustrated in FIG. 8 are the same as in FIG. 5.

In step S301, the determination unit 14A sets a duty ratio according to the intensity of a feeling of the user U1 estimated by the feeling estimation unit 12. The one time set by the determination unit 14A becomes higher, for example, as the intensity of the estimated feeling becomes higher. More specifically, if the intensity of the feeling of the user U1 is relatively low, the determination unit 14A sets a relatively low duty ratio (refer to FIG. 9(a)). On the other hand, if the intensity of the feeling of the user U1 is relatively high, the determination unit 14A sets a relatively high duty ratio (refer to FIG. 9(b)).

In step S302, the display control unit 16A displays the feeling of the user U1 by the duty ratio set in step S301 by the determination unit 14A.

The information display apparatus 2A thus displays the estimated feeling of the user U1 outside the vehicle at a position hidden from the user U1, who is inside the vehicle. A period of time for which the estimated feeling is displayed is set in accordance with the intensity of the estimated feeling. Since the estimated feeling is displayed at a position hidden from the user U1, the user U1 does not see the displayed feeling and is not embarrassed. As a result, the feeling of the user U1 does not change due to the displayed feeling.

If the user U1 is calm, the determination unit 14A may inhibit the display unit 17 from displaying a feeling in order not to impose a psychological stress, such as embarrassment, on the user U1. In addition, since nearby vehicles can stay away from a vehicle in which a driver is angry or irritated, traffic safety can be achieved. In this case, an automobile insurance whose premium changes in accordance with a ratio of a certain feeling in a feeling log can be constructed.

In addition, the driver may be notified, through an indicator or the like, of a timing at which the display unit 17 displays a feeling. In this case, the user U1 learns when his/her own feeling is displayed, and a psychological stress such as embarrassment can be reduced. Alternatively, a feeling to be displayed may be displayed to the user U1 in advance. The user U1 may then determine whether to display the feeling, and the display control unit 16A may control the display unit 17 in accordance with a result of the determination. In this case, the determination unit 14A may constantly display or does not at all display certain feelings such as anger and irritation, regardless of a result of a determination made by the user U1.

The information display apparatus 2A can thus display the feeling of the user U1 outside the vehicle for a period of time according to the intensity of the feeling, which leads to safe driving of another driver.

Although an example in which a duty ratio is adjusted in accordance with the intensity of a feeling has been described, the luminance of a displayed feeling may be adjusted, instead. A color in which a feeling is displayed may be changed, or another method may be used insofar as visibility from nearby drivers can be adjusted.

Second Modification of Second Embodiment

In a second modification of the second embodiment, an information display apparatus according to another embodiment that displays an estimated feeling more appropriately will be specifically described. An information display apparatus 3 according to the present modification controls the vehicle and traffic signals on the basis of the feeling of the user U1, who is the driver or a customer.

Figure 10:
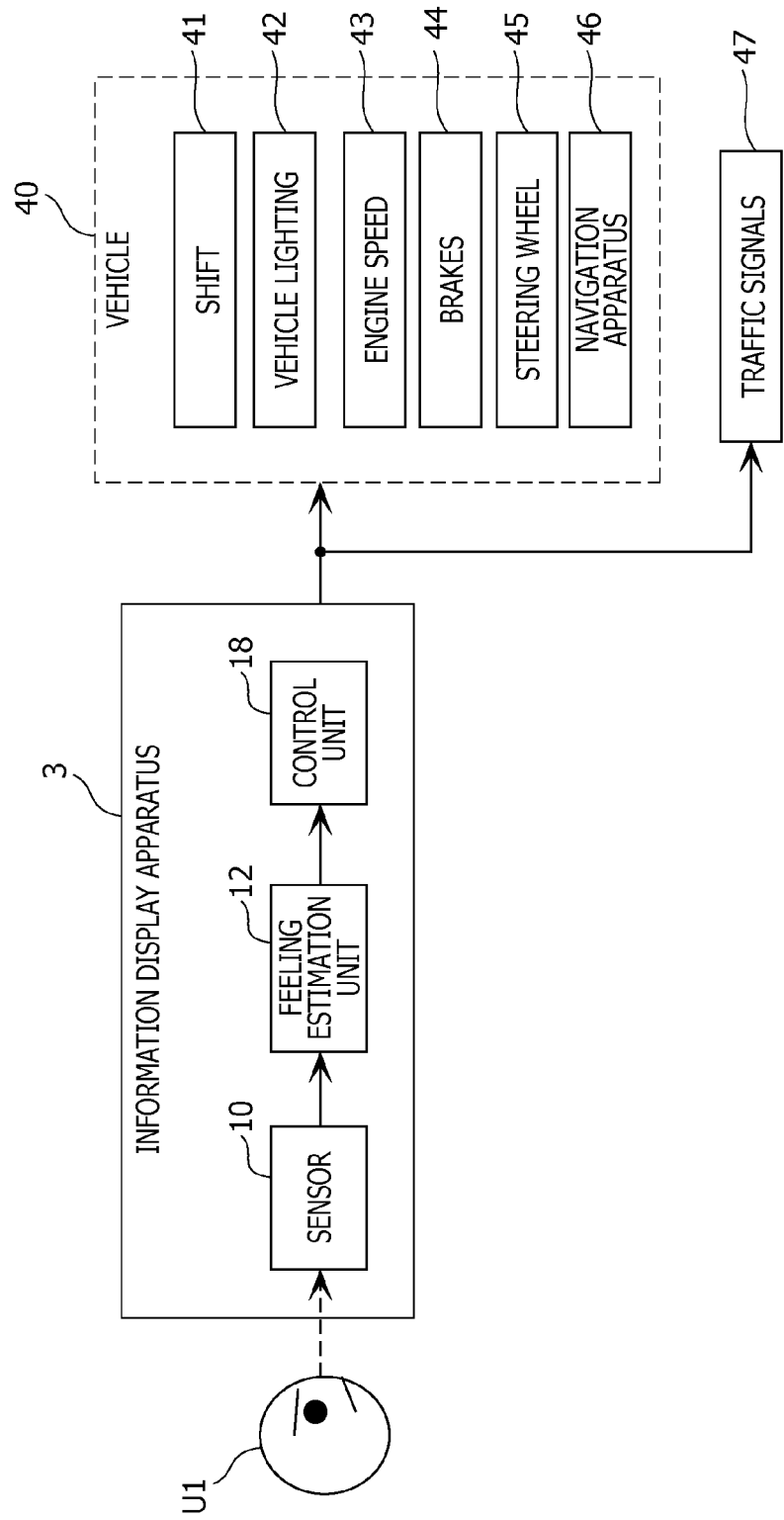
FIG. 10 is a diagram illustrating functional blocks of an information display apparatus according to a second modification of the second embodiment.

FIG. 10 is a diagram illustrating functional blocks of the information display apparatus 3 according to the present modification.

As illustrated in FIG. 10, the information display apparatus 3 includes the sensor 10, the feeling estimation unit 12, and a control unit 18. The same components as those according to one of the above embodiments and modification are given the same reference numerals, and detailed description thereof is omitted.

The control unit 18 is a processing unit that controls devices (e.g., a shift 41, vehicle lighting 42, engine speed 43, brakes 44, a steering wheel 45, and a navigation apparatus 46) included in a vehicle 40 and traffic signals 47 on the basis of a feeling of the user U1 estimated by the feeling estimation unit 12.

If the vehicle 40 is a taxi, for example, the information display apparatus 3 estimates the customer's feeling. If the customer is scared, the information display apparatus 3 limits speed, makes an accelerator heavier, or switches to automated driving without notifying a driver of the control. In addition, if there is a drowsy person during automated driving, for example, the information display apparatus 3 may enter a soft driving mode (lower acceleration and deceleration). Alternatively, the information display apparatus 3 may enter a silent mode (higher gears are used). If there is an anxious person, the information display apparatus 3 may cause the vehicle 40 to enter a fast lane. If someone gets carsick (peripheral blood flow volume decreases), the information display apparatus 3 may limit the speed. As a result, more comfortable driving is achieved for the customer without notifying the driver of the customer's feeling. A driving mode, needless to say, may be automatically changed in accordance with an estimated feeling, or the feeling may be displayed to the driver and the driver may select the driving mode. If there are a plurality of passengers, a feeling may be displayed to the driver. In this case, the feeling may be displayed such that the driver does not identify whose feeling it is. Since the driver does not know whose feeling it is, the passengers do not feel a psychological stress such as embarrassment.

In addition, the information display apparatus 3 may learn music that sweeps away drowsiness or leads to arousal. Since favorite songs and songs that lead to arousal differ between individuals, effective music or songs may be learned and played back when a person is drowsy.

In addition, the information display apparatus 3 may control, in accordance with the driver's feeling, timings at which the traffic signals 47 change. If the driver is irritated, the traffic signal 47 may be controlled such that the vehicle 40 stops at the traffic signals 47 less often. If the driver is happy, the traffic signals 47 may be controlled such that the vehicle 40 stops at the traffic signals 47 more often to continue a current state and extend happy time. This is effective during a date or the like.

In addition, the information display apparatus 3 may estimate a feeling of a customer of a taxi or a passenger that he/she wants to go to a toilet. If estimating such a feeling, the information display apparatus 3 may display a closest toilet on the navigation apparatus 46. In addition, the information display apparatus 3 may estimate a degree of hunger of a customer of a taxi or a passenger as a feeling and, in emergency, change the color of the vehicle lighting 42 to blue to suppress hunger. If the person has time to have a meal, the information display apparatus 3 may stimulate hunger using red lighting and recommend a restaurant. In addition, a current feeling of the driver may be displayed on a taxi search site, and a customer may choose a taxi that suits his/her mood on the basis of the displayed feeling. When the customer is drowsy, for example, the customer can choose a taciturn driver, and when the customer is in a hurry, the customer can choose a driver whose concentration is high.

In addition, the information display apparatus 3 may sense a frown of a passenger or the driver and navigate the vehicle 40 to a shady road to achieve comfortable taxi transportation. On the other hand, if a passenger or the driver is drowsy, the information display apparatus 3 may navigate the vehicle 40 to a bright road to achieve comfortable driving.

In addition, if the driver is drowsy, the information display apparatus 3 allows a passenger to talk to the driver by displaying the driver's feeling to the passenger. This is effective since it is hard for the driver to tell the passenger he/she is drowsy and wants to take a break.

In addition, the information display apparatus 3 may display an estimated feeling on the basis of a camera image of the driver only while the driver is not looking back through a rearview mirror. In this case, the driver does not feel that his/her mind is seen through.

In addition, the information display apparatus 3 may display the driver's feeling using words other than ones indicating a feeling. If the driver's face looks drowsy or the driver is irritated during driving, for example, the driver's feeling may be expressed as an accident occurrence probability or the like and displayed to the driver. Alternatively, the information display apparatus 3 may monitor the driver's feeling and, if an accident is likely to occur, ask the driver to take a break or stop the vehicle through remote control.

Third Modification of Second Embodiment

In a third modification of the second embodiment, an information display apparatus according to another embodiment that displays an estimated feeling more appropriately will be specifically described. An information display apparatus 4 according to the present modification displays a driving risk of the user U1 who is the driver on the basis of a drowsiness level as a feeling of the user U1.

Figure 11:
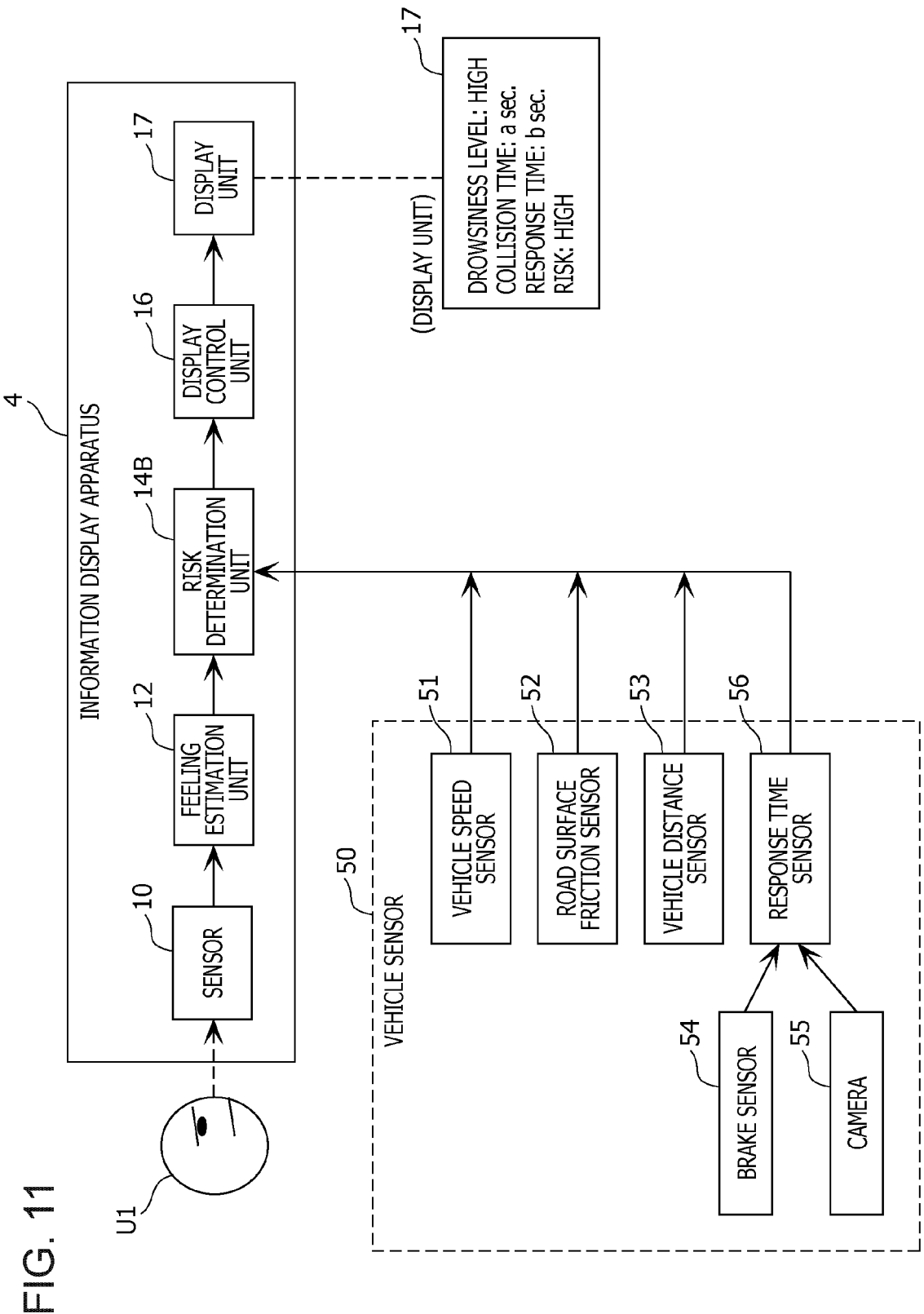
FIG. 11 is a diagram illustrating functional blocks of an information display apparatus according to a third modification of the second embodiment.

FIG. 11 is a diagram illustrating functional blocks of the information display apparatus 4 according to the present modification.

As illustrated in FIG. 11, the information display apparatus 4 includes the sensor 10, the feeling estimation unit 12, a risk determination unit 14B, the display control unit 16, and the display unit 17. The same components as those according to one of the above embodiments and modifications are given the same reference numerals, and detailed description thereof is omitted.

The risk determination unit 14B is a processing unit that determines the driving risk of the user U1 on the basis of the drowsiness level as a feeling of the user U1 estimated by the feeling estimation unit 12. If the estimated drowsiness level of the user U1 is high, the risk determination unit 14B determines that the risk is high. The risk determination unit 14B may determine the risk on the basis of not only the feeling estimated by the feeling estimation unit 12 but also various pieces of data provided by one of vehicle sensors 50 (e.g., a vehicle speed sensor 51, a road surface friction sensor 52, a vehicle distance sensor 53, and a response time sensor 56 that calculates a response time using a brake sensor 54 and a camera 55).

The risk determination unit 14B may also calculate a collision time and a response time. The collision time refers to an estimated time taken for the vehicle to collide since a dangerous event occurred ahead of the vehicle. The collision time may be calculated from a distance to a vehicle ahead, relative speed, relative acceleration, and the like. Although a speed and an acceleration when a vehicle ahead enters a dangerous state are needed to calculate the relative speed and the relative acceleration, the relative speed and the relative acceleration may be estimated from the speed, the acceleration, or a road surface friction coefficient of the vehicle ahead during driving, instead. The response time refers to a time taken for the driver to apply the brakes since a dangerous event occurred ahead of the vehicle. The response time can be obtained on the basis of, for example, a time taken for the driver to apply the brakes since a driver of the vehicle ahead applied the brakes and tail lamps lighted up.

The risk determination unit 14B provides information indicating an estimated drowsiness level and information indicating an estimated risk for the display control unit 16.

The display control unit 16 controls the display unit 17 such that the display unit 17 displays the information indicating the risk and the like determined by the risk determination unit 14B.

The information display apparatus 4, for example, may notify the driver of the driving risk along with information other than a feeling such as drowsiness. More specifically, the information display apparatus 4 may obtain and display, on the basis of the vehicle speed, the road surface friction coefficient, and the distance to the vehicle ahead, the collision time at a time when the vehicle ahead suddenly stops. In order to quantize drowsiness, the camera 55 may capture an image of a scene ahead of the vehicle and the information display apparatus 4 may obtain the response time from the time taken for the driver to apply the brakes since the driver of the vehicle ahead applied the brakes. In this calculation, a known relationship between drowsiness and the response time, that is, a fact that when a person is drowsy, the response time increases, is used. The driving risk may be quantized on the basis of some or all of these pieces of information and displayed to the driver.

Third Embodiment

In a third embodiment, an information display apparatus according to another embodiment that displays an estimated feeling more appropriately will be specifically described. An information display apparatus 5 according to the present embodiment displays the feeling of the user U1 who is using a toilet inside the toilet to the user U2 who is waiting outside the toilet to use the toilet.

Figure 12:
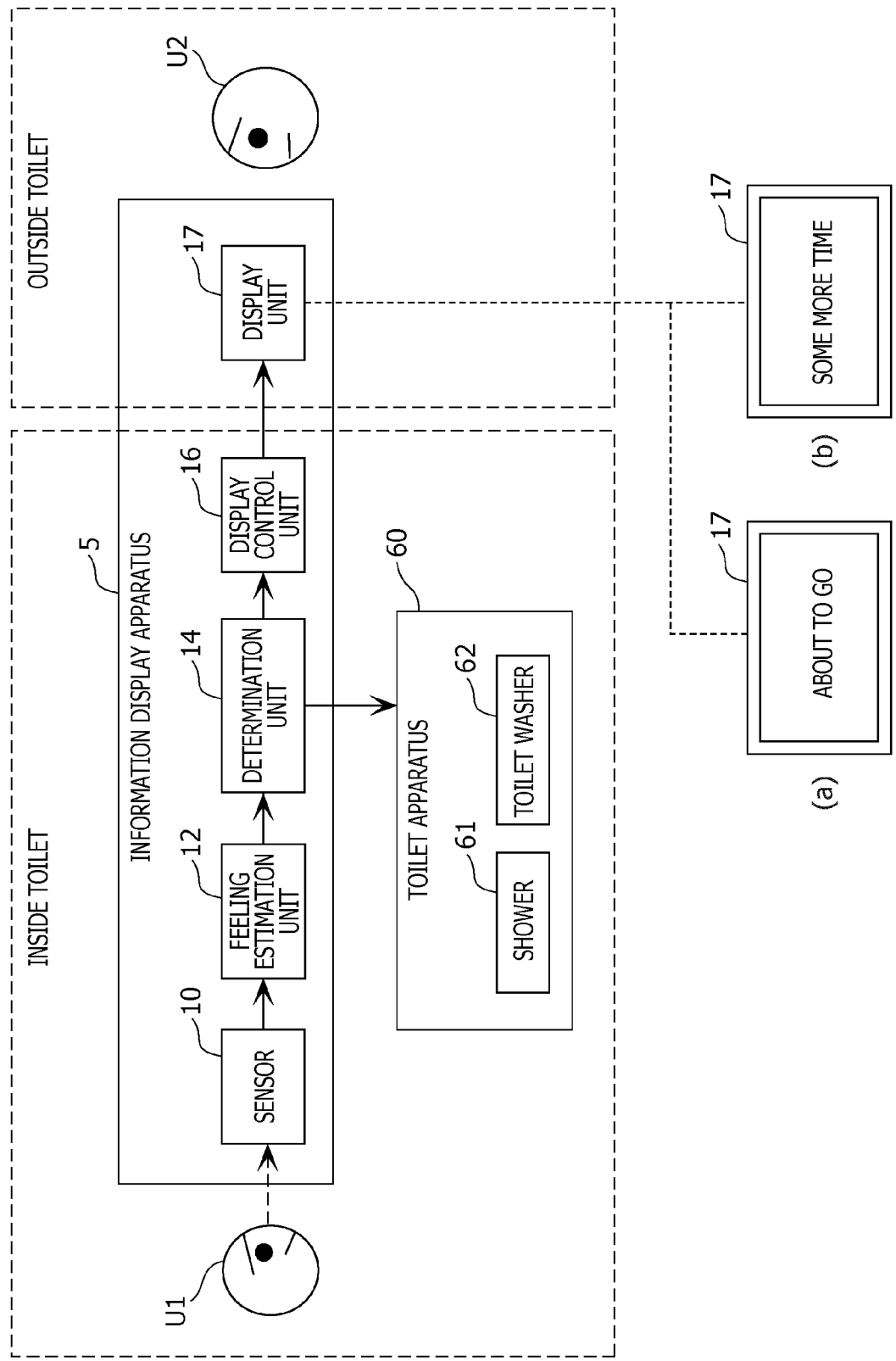
FIG. 12 is a block diagram illustrating functional blocks of an information display apparatus according to a third embodiment.

FIG. 12 is a block diagram illustrating functional blocks of the information display apparatus 5 according to the present embodiment.

As illustrated in FIG. 12, the information display apparatus 5 includes the sensor 10, the feeling estimation unit 12, the determination unit 14, the display control unit 16, and the display unit 17. Among the components of the information display apparatus 5, at least the sensor 10 is provided inside the toilet, and the display unit 17 is provided outside the toilet. The same components as those according to the first embodiment are given the same reference numerals, and detailed description thereof is omitted.

The feeling estimation unit 12 estimates the feeling of the user U1 who is using the toilet inside the toilet on the basis of a physical value obtained by the sensor 10.

The determination unit 14 determines, on the basis of the feeling estimated by the feeling estimation unit 12, whether the user U1 is finishing using the toilet.

The display control unit 16 displays a result of the determination made by the determination unit 14 to the user U2 using the display unit 17. More specifically, the display control unit 16 displays, on the basis of the result of the determination made by the determination unit 14, a message (e.g., FIG. 12(*a*)) indicating that the user U1 is finishing using the toilet or a message (e.g., FIG. 12(*b*)) indicating that the user U1 is still using the toilet. The user U2 can learn whether he/she can soon use the toilet, and anxiety or irritation that would have been caused if the user U2 did not know how long he/she needed to wait can be reduced.

The determination unit 14 may automatically operate a toilet apparatus 60 (a shower 61 or a toilet washer 62) if the feeling of the user U1 estimated by the feeling estimation unit 12 changes to "carefree (relaxed)". This is convenient to the user U1 while certainly operating the toilet washer 62 and prompting the user U1 to leave. If the feeling of the user U1 changes to "carefree", the determination unit 14 may start a countdown to leaving on the display unit 17. In this case, anxiety or irritation of the user U2 who is waiting outside to use the toilet can be reduced.

Modification of Third Embodiment

In a modification of the third embodiment, an information display apparatus according to another embodiment that displays an estimated feeling more appropriately will be specifically described. An information display apparatus 6 according to the present modification displays the feeling of the user U1 who is waiting outside a toilet to use the toilet to the user U2 who is using the toilet inside the toilet. That is, in the present modification, positions of the users U1 and U2 in the third embodiment are switched.

Figure 13:
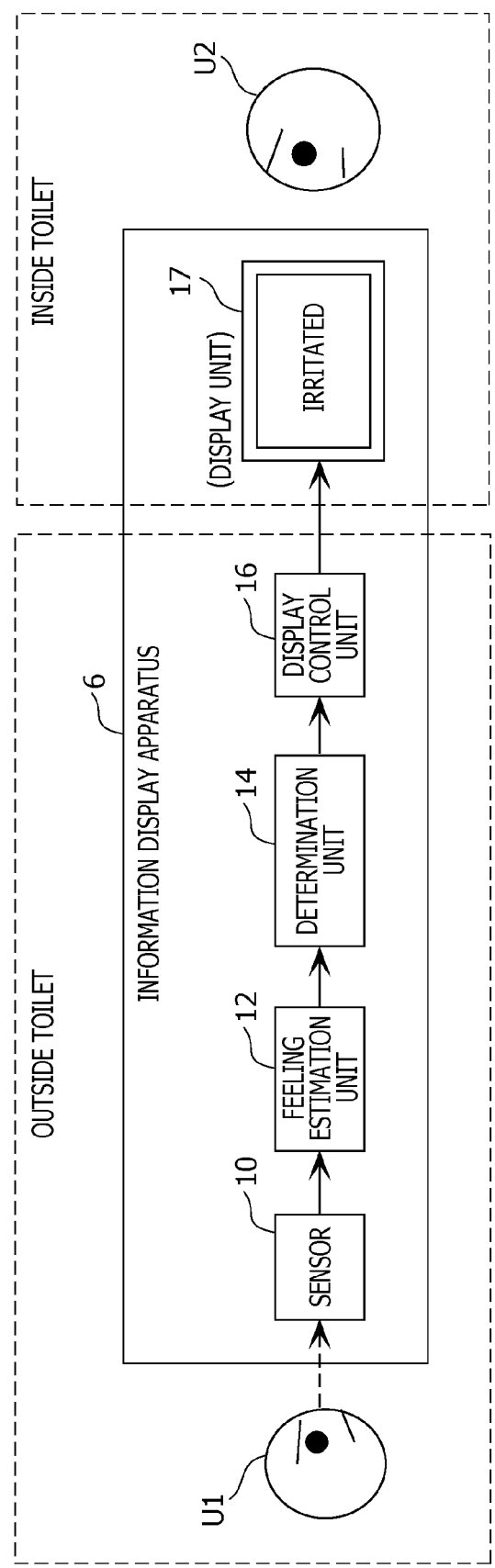
FIG. 13 is a block diagram illustrating functional blocks of an information display apparatus according to a modification of the third embodiment.

FIG. 13 is a block diagram illustrating functional blocks of the information display apparatus 6 according to the present modification.

As illustrated in FIG. 13, the information display apparatus 6 includes the sensor 10, the feeling estimation unit 12, the determination unit 14, the display control unit 16, and the display unit 17. Among the components of the information display apparatus 6, at least the sensor 10 is provided outside the toilet, and at least the display unit 17 is provided inside the toilet. The same components as those according to the first embodiment are given the same reference numerals, and detailed description thereof is omitted.

The feeling estimation unit 12 estimates the feeling of the user U1 who is waiting outside the toilet to use the toilet on the basis of a physical value obtained by the sensor 10.

The determination unit 14 determines whether the feeling estimated by the feeling estimation unit 12 is a feeling determined in advance to be displayed to the user U2. Alternatively, the determination unit 14 may determine whether the intensity of the feeling estimated by the feeling estimation unit 12 exceeds a certain value.

The display control unit 16 controls the display unit 17 on the basis of a result of the determination made by the determination unit 14. More specifically, if the determination unit 14 determines that the estimated feeling is a feeling determined in advance to be displayed to the user U2 or that the intensity of the estimated feeling exceeds the certain value, the display control unit 16 displays the feeling.

If the user U2 has finished using the toilet and is relaxed when the feeling of the user U1 is displayed, for example, the user U2 can promptly leave the toilet. If the user U1 has a relatively strong feeling (e.g., the user U1 is losing patience and angry or irritated), the user U2 can hurry up and leave the toilet. If the functions of the information display apparatus 5 according to the third embodiment are added to the information display apparatus 6, feelings of persons inside and outside the toilet can be displayed to each other, which is advantageous to both the persons.

Fourth Embodiment

In a fourth embodiment, an information display apparatus according to another embodiment that displays an estimated feeling more appropriately will be specifically described. An information display apparatus 7 according to the present embodiment, for example, displays feelings of a plurality of students to a teacher in a classroom. The information display apparatus 7 is not limited to this, and may be applied to a case in which feelings of a plurality of attendants are displayed to a lecturer or a facilitator in a preparatory school, a seminar, a meeting, or the like.

Figure 14:
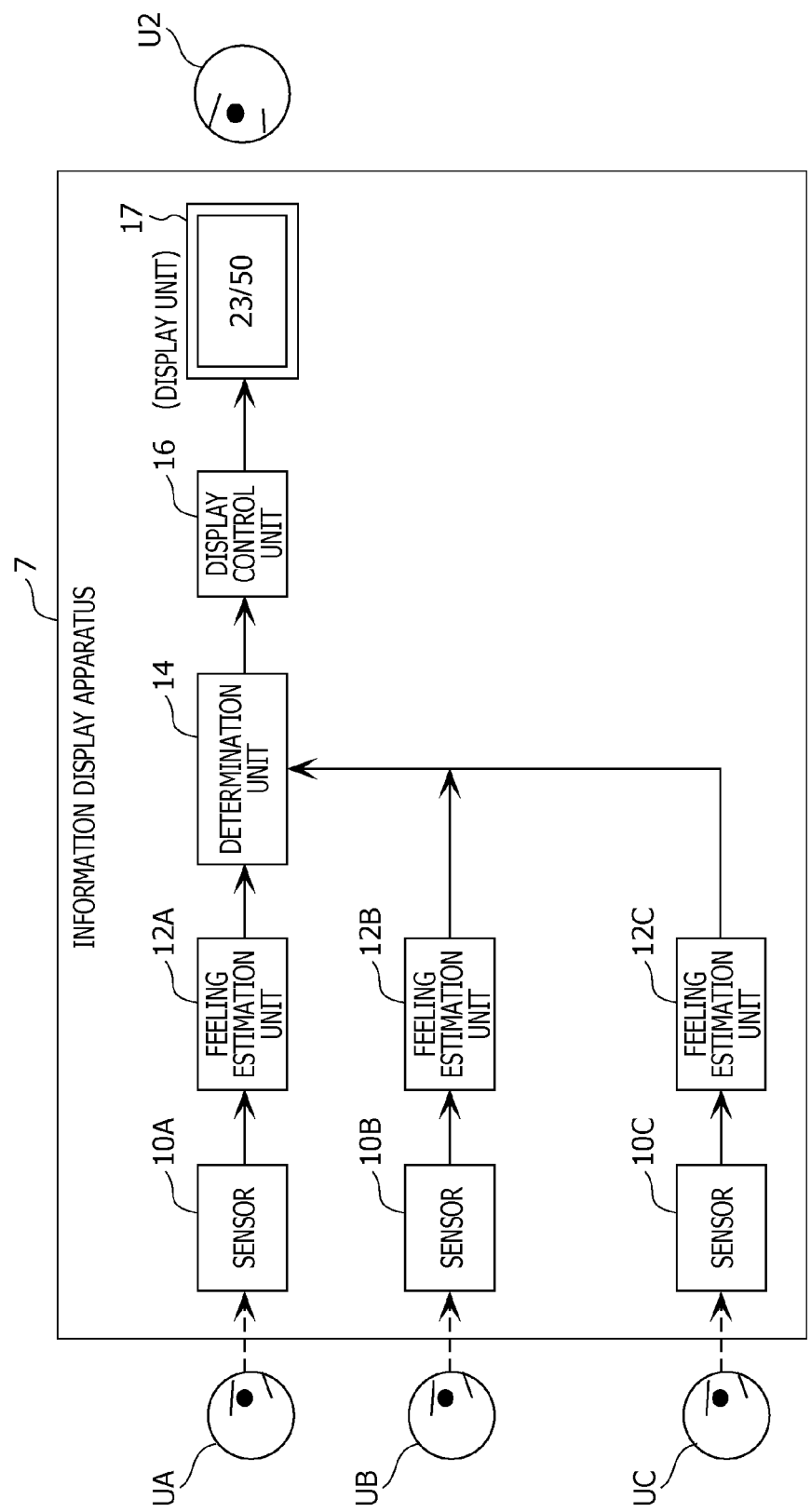
FIG. 14 is a block diagram illustrating functional blocks of a first example of an information display apparatus according to a fourth embodiment.

FIG. 14 is a block diagram illustrating functional blocks of a first example (information display apparatus 7) of the information display apparatus according to the present embodiment.

As illustrated in FIG. 14, the information display apparatus 7 includes a plurality of sensors 10A, 10B, and 10C (hereinafter also referred to as "sensors 10A to 10C"), a plurality of feeling estimation units 12A, 12B, and 12C (hereinafter also referred to as "feeling estimation units 12A to 12C"), the determination unit 14, the display control unit 16, and the display unit 17. The same components as those according to the first embodiment are given the same reference numerals, and detailed description thereof is omitted.

The sensors 10A to 10C are an example of sensors used by the feeling estimation units 12A to 12C to estimate feelings of users UA to UC, who are students. More specifically, the sensors 10A to 10C are cameras.

The feeling estimation units 12A to 12C estimate the feelings of the users UA to UC, who are students, on the basis of physical values obtained by the sensors 10A to 10C, respectively.

The determination unit 14 generates information by collecting feelings estimated by the feeling estimation units 12A to 12C and determines whether to display the generated information on the display unit 17.

The feeling estimation units 12A to 12C estimate, for example, that the students are not keeping up with a class and displays these feelings on the display unit 17 to the teacher. In this case, the teacher can understand the feelings even if the students do not raise hands. This is also advantageous in that the teacher can learn whether the plurality of students are keeping up with the class and obtain statistical information such as the number of students who are not keeping up with the class. As a result, if a certain number of students are not keeping up with the class, the teacher can teach again or provide a supplementary lesson. Since the students can be given a lesson without telling the teacher that they are not keeping up with the class, a psychological stress can be reduced. This is significantly effective especially for students who have difficulty telling the teacher about their situations. Alternatively, the number of students who are not keeping up with the class may be displayed to all students. If there are a plurality of students who are not keeping up with the class, one of such students might be able to tell the teacher, without fear, that he/she is not keeping up with the class.

Alternatively, the information display apparatus 7 may estimate that the students are not interested in the class, instead of estimating that the students are not keeping up with the class. In this case, the teacher can reconsider a way he/she teaches.

Figure 15:
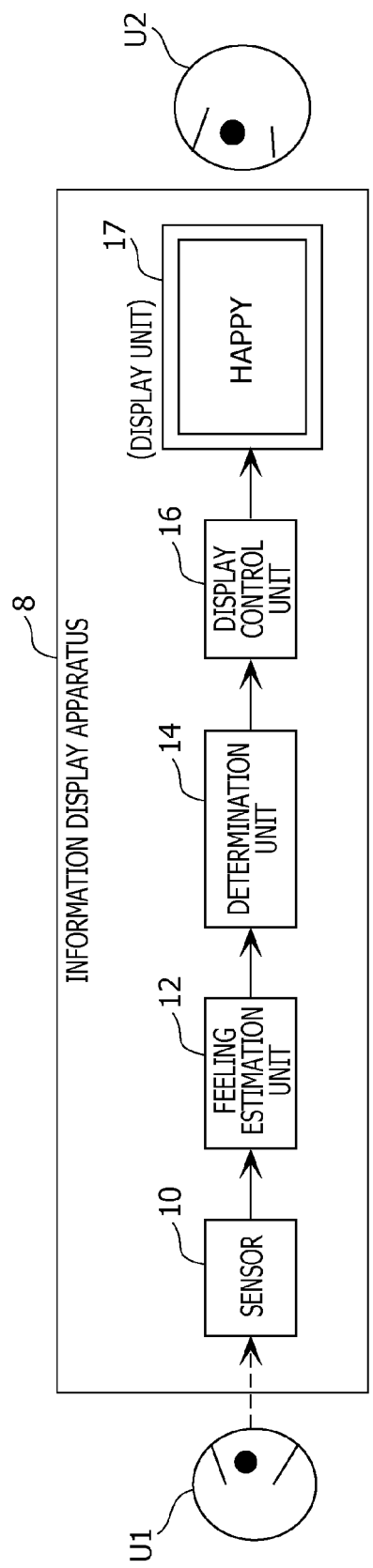
FIG. 15 is a block diagram illustrating functional blocks of a second example of the information display apparatus according to the fourth embodiment.

FIG. 15 is a block diagram illustrating functional blocks of a second example (information display apparatus 8) of the information display apparatus according to the present embodiment. The information display apparatus 8 supports an appropriate exchange between a customer and a clerk in a store or the like.

As illustrated in FIG. 15, the information display apparatus 8 includes the sensor 10, the feeling estimation unit 12, the determination unit 14, the display control unit 16, and the display unit 17.

For example, the feeling estimation unit 12 estimates a customer's feeling in a fitting room of a store. The determination unit 14 determines whether to display the feeling estimated by the feeling estimation unit 12 outside the fitting room or to a clerk. The display control unit 16 displays or does not display the estimated feeling on the display unit 17 on the basis of a result of the determination. As a result, the clerk can learn whether the customer really liked a product and bought the product or just bought the product, and the clerk's customer-service skills can be determined.

In an airplane, for example, the feeling estimation unit 12 estimates a passenger's feeling and displays the passenger's feeling on the display unit 17, and an attendant can learn the passenger's feeling and a physical condition assumed from the passenger's feeling. As a result, the attendant can promptly provide a service for a passenger whose physical condition is relatively poor. This is advantageous for a passenger who is hesitant about telling the attendant that he/she is in poor physical condition.

In a bar or a restaurant, for example, the feeling estimation unit 12 estimates a degree of intoxication of a customer and displays the degree of intoxication on the display unit 17, and a clerk can determine whether to serve another glass of drink (alcohol). It can be assumed, for example, that the customer is most relaxed when the amount of alcohol in the customer's body is appropriate. If the display unit 17 displays changes in a degree of relaxation and the clerk checks the changes, therefore, the clerk can make the determination. If another glass of drink is not to be served, the clerk may serve a glass of drink whose alcohol concentration has been decreased (e.g., diluted with water) or a dish that can prevent sickness.

In an office, for example, the feeling estimation unit 12 may estimate workers' feelings using a communication tool for transmitting texts, enabling voice communication, or indicating presence of the workers and display the workers' feelings on the display unit 17. As a result, a worker can talk to another worker at a right timing. In addition, if a worker's feeling is not displayed to the worker himself, the worker does not try to change his feeling, which improves an accuracy of estimating a feeling. In addition, priority in the adjustment of a schedule of meetings and the like may be changed in accordance with the estimated feelings of the workers. The schedule may be changed, for example, such that workers who are not irritated adjust to an irritated worker. The priority in the adjustment of the schedule may be determined in accordance with a degree of irritation. Because an irritated worker is often busy, overall labor productivity in an office or a company can be improved by giving priority to a schedule of the busy worker. In addition, a mental health may be maintained by limiting overtime hours of an irritated person. In addition, if the information display apparatus 8 suggests to a boss that he/she distribute work to less stressed workers, the labor productivity improves. In addition, the feeling estimation unit 12 may estimate the irritation of a worker who is engaged in dangerous work in a factory or the like. Since an accident can happen when a worker is irritated, if an alarm is issued to a person in charge, an accident can be prevented beforehand. This is effective especially in a workplace where a human error can lead to a major accident, such as a dock.

In the case of a player of a game, for example, the feeling estimation unit 12 estimates a degree of irritation of the player. A story of the game may be changed in accordance with the player's feeling. More specifically, if the player is irritated, it may be determined that the player does not know what to do, and the difficulty of the game may be decreased. If the player is bored, the difficulty of the game may be increased. If the player is sexually aroused, sexual plots may be added. In addition, the physical ability of a character in the game may be changed in accordance with the player's feeling. As a result, the player can have a feeling of achievement.

The information display apparatus 8 may estimate the feeling of a guest to a facility and change display color or the color of a ticket in the facility in accordance with the estimated feeling.

The information display apparatus 8 may, for example, change a guarding method in accordance with feelings of a group. Many guards may be arranged in an area in which there are many angry or excited persons.

The information display apparatus 8 may, for example, visualize estimated feelings of customers in a store as a feeling map. More specifically, if there are many drowsy customers, the information display apparatus 8 may increase the luminance of lighting while turning up an air cooler. In addition, a person sexually aroused in a train can be detected and monitored and, if necessary, arrested in the act of committing a crime. Furthermore, whether or not the person has committed a crime or will commit a crime can be detected on the basis of surprise at a time when the person finds a police officer or the like. In addition, in a nursing home or an office, a stressed person can be monitored.

The information display apparatus 8, for example, can be used for taking measures against depression. A memory of a good feeling is logged and displayed when a person has a negative feeling, in order to lead the person to the good feeling. In addition, a person's feeling can be transmitted through a phone in accordance with the feeling of a person on the other end of the phone. The person's feeling may be displayed on a display as a color. If a person is angry, vibration may be used. The ending of a word may change in accordance with the feeling.

Figure 16:
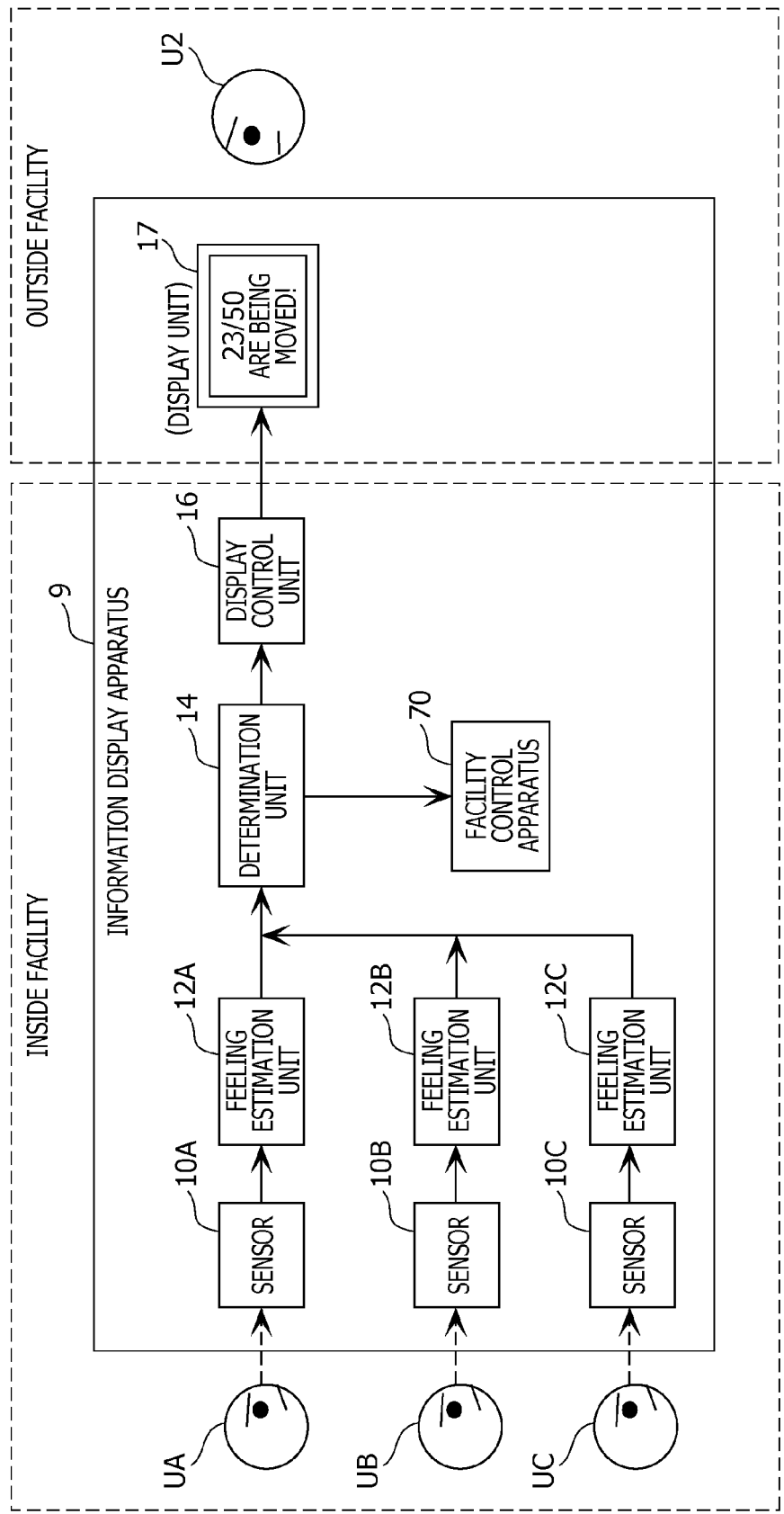
FIG. 16 is a block diagram illustrating functional blocks of a third example of the information display apparatus according to the fourth embodiment.

FIG. 16 is a block diagram illustrating functional blocks of a third example (information display apparatus 9) of the information display apparatus according to the present embodiment.

As illustrated in FIG. 16, the information display apparatus 9 includes the plurality of sensors 10A, 10B, and 10C (hereinafter also referred to as the "sensors 10A to 10C"), the plurality of feeling estimation units 12A, 12B, and 12C (hereinafter also referred to as the "feeling estimation units 12A to 12C"), the determination unit 14, the display control unit 16, the display unit 17, and a facility control apparatus 70. Among the components of the information display apparatus 9, at least the sensors 10A to 10C are provided inside a facility, and at least the display unit 17 is provided outside the facility. The same components as those according to the first embodiment are given the same reference numerals, and detailed description thereof is omitted.

In an event facility or the like, for example, the feeling estimation units 12A to 12C estimate feelings of the users UA to UC, who are guests. The feeling estimation units 12A to 12C estimate whether the feelings of the users UA to UC are negative, and display the estimated feelings on the display unit 17 to a manager or an administrator of the facility. The manager of the facility or the like can change the atmosphere of a place where many guests have negative feelings such that guests have positive feelings. More specifically, for example, the manager of the facility or the like can provide an enjoyable store, a character, or an event. In addition, the manager of the facility or the like may arrange products that have made the guests' feelings positive at conspicuous positions in order to promote sales. In addition, the manager of the facility may include feelings of customers who have bought a product in advertising copy, such as "Popular among people who are feeling sad".

In addition, in a movie theater or an amusement facility, the information display apparatus 9 may estimate feelings of a plurality of audience members and change a story of a movie, lighting, or a sound effect on the basis of the estimated feelings.

In addition, in a movie theater or an amusement facility, the information display apparatus 9 may display estimated feelings of a plurality of audience members at an entrance. The number of persons who have been moved, the number of persons who have cried, or the like, for example, may be displayed outside the facility to appeal to outside customers.

Figure 17:
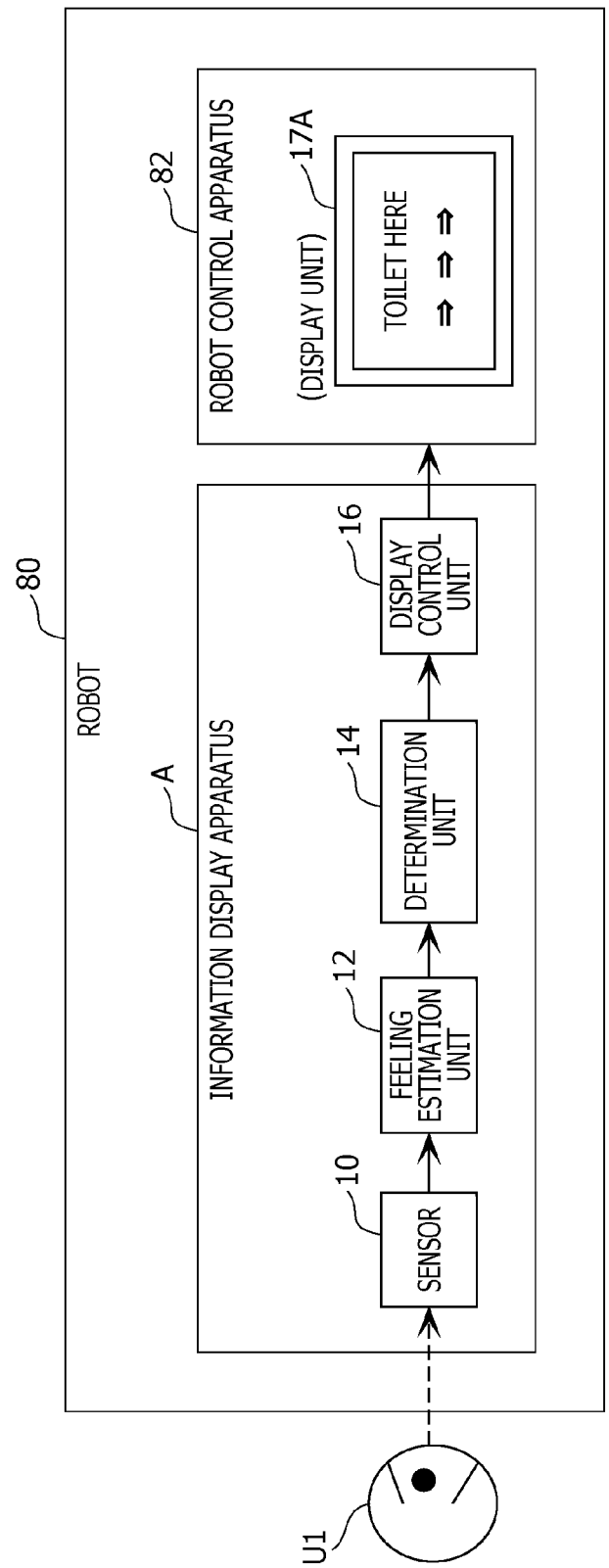
FIG. 17 is a block diagram illustrating functional blocks of a fourth example of the information display apparatus according to the fourth embodiment.

FIG. 17 is a block diagram illustrating functional blocks of a fourth example (information display apparatus A) of the information display apparatus according to the present embodiment.

As illustrated in FIG. 17, the information display apparatus A includes the sensor 10, the feeling estimation unit 12, the determination unit 14, and the display control unit 16. The information display apparatus A is a function of a robot 80, and the display control unit 16 controls a display unit 17A of a robot control apparatus 82.

The feeling estimation unit 12 estimates, for example, whether the user U1 wants to go to a toilet. The determination unit 14 determines, on the basis of the feeling estimated by the feeling estimation unit 12, whether to provide guidance information indicating the location of the toilet, and the display control unit 16 displays the estimated feeling on the display unit 17A on the basis of a result of the determination. Whether the user U1 wants to go to the toilet can be determined on the basis of a twitch in the neck of the user U1, sweating, or how high the shoulders of the user U1 are raised, which is detected by the sensor 10. As a result, a person who wants to go to a toilet can go to the toilet without being noticed. The guidance information refers to information indicating the location of a toilet, such as "Toilet Here" or an arrow indicating the location of the toilet.

Whether the user U1 wants to go to a toilet may be determined using another method. For example, the determination may be made on the basis of blood pressure or the amount of perspiration. When a person wants to go to a toilet, blood pressure and the amount of perspiration increase.

In addition, the feeling estimation unit 12 determines whether the user U1 is sexually aroused. As a result, the display unit 17 can provide information indicating the location of a sex establishment or the like or inform a partner of the situation by phone or the like. If an elderly person is sexually aroused, a sexual image may be automatically displayed in a toilet.

In addition, the feeling estimation unit 12 may estimate feelings of a plurality of audience members who have just finished watching a sport game and identify which team the audience members have been supporting. Words to be announced to the audience members may then be changed in accordance with the identified team. If the audience members are happy, for example, words that increase the happiness are announced. If the audience members are vexed, complaining words are announced to reduce the vexation.

FIG. 18 is a block diagram illustrating functional blocks of a fifth example (information display apparatus B) of the information display apparatus according to the present embodiment.

As illustrated in FIG. 18, the information display apparatus B includes the sensor 10, the feeling estimation unit 12, the determination unit 14, the display control unit 16, the display unit 17, a microphone 90, and a speech recognition unit 92. The information display apparatus B estimates and displays a degree of irritation of the user U1 who is a suspect, which is effective when an examining official interrogates the suspect.

The microphone 90 collects the sound of conversation between the examining official and the suspect and generates an electrical signal.

The speech recognition unit 92 is a processing unit that obtains the electrical signal generated by the microphone 90 and that generates a text from the sound of the conversion between the examining official and the suspect. The text can be obtained using a known technique.

The determination unit 14 determines, on the basis of a result of the speech recognition performed by the speech recognition unit 92, whether to display the feeling of the user U1 estimated by the feeling estimation unit 12 on the display unit 17.

The feeling estimation unit 12, for example, estimates the irritation of the user U1, who is the suspect under interrogation, and displays the irritation to a police officer outside a room. The microphone 90 may monitor the conversation inside the room. The information display apparatus B associates the irritation and the conversion with each other and displays what is irritating the suspect. Since what is irritating the suspect can be identified even if the suspect maintains his/her silence, interrogation policies improve. The interrogation may be output only as sound using a speaker or the like, but if the interrogation is described as text information, the flow of the conversation becomes clearer. The information display apparatus B may directly display the estimated feeling and the conversation on the display unit 17 to the examining official without being noticed by the suspect.

In an immigration inspection, for example, the feeling estimation unit 12 estimates the feeling of a person under inspection and displays the person's feeling to an inspector. If the person under inspection is irritated or scared, the inspector questions the person and takes appropriate measures on the basis of the person's feeling. The information display apparatus B may display the person's feeling on a monitor or the like hidden from the person. If the person is tense, irritated, or scared, the information display apparatus B may prompt the inspector to keep asking questions and monitors changes in the person's feeling, in order to screen the person more deeply. If the person is not tense or is happy, the inspector may simplify the immigration inspection to reduce inspection time. Alternatively, the information display apparatus B may detect a pulse wave or skin temperature while taking the person's fingerprints, in order to detect tension or a health problem. The information display apparatus B can detect whether the person has committed a crime or will commit a crime on the basis of a change in feeling at a time when a buzzer goes off at a departure gate.

In a law court, for example, the information display apparatus B can check whether there is a lie in testimony on the basis of words uttered by a witness, a defendant, or a plaintiff or a feeling such as uneasiness. A counsel can ask a question on the basis of the feeling. The information display apparatus B can estimate whether there is room for extenuation on the basis of a feeling at a time when the defendant says "I am regretting" or is crying.

Although an example in which a feeling is sensed on the basis of the LF/HF has been described in the above embodiments, the sensing method is not limited to this. A feeling may be sensed on the basis of biological information such as a heart rate, a heartbeat waveform, a pulse wave, a pulse waveform, a degree of opening of the eyes, pupil diameter, blood flow volume, oxygen saturation, complexion, gaze, the amount of perspiration, a respiration rate, respiratory volume, skin temperature, or body temperature, instead.

The components in the above embodiments may be achieved by dedicated hardware or by executing a software program that suits the components. The components may be achieved by a program execution unit, such as a central processing unit (CPU) or a processor, by reading and executing a software program stored in a recording medium such as a hard disk or a semiconductor. The software program that achieves the information display apparatus and the like in each of the above embodiments is as follows.

That is, the program is a method for controlling an information display apparatus that displays information on a display seen by a plurality of users. The method includes estimating a feeling of a first user among the plurality of users on the basis of a physical value obtained from a sensor, determining, using the obtained physical value or the estimated feeling, whether to display the estimated feeling, and controlling the display in accordance with a result of the determining.

Although an information display apparatus and the like according to one or a plurality of aspects has been described with reference to the embodiments, the present disclosure is not limited to the embodiments. The one or plurality of aspects may include embodiments constructed by modifying the embodiments in various ways conceived by those skilled in the art or by combining components in different embodiments, insofar as the scope of the present disclosure is not deviated from.

The present disclosure can be applied to an information display apparatus that displays an estimated feeling more appropriately. More specifically, the present disclosure can be applied to a navigation apparatus for a vehicle.

What is claimed is:

1. A method for controlling an information display apparatus that displays information on a display seen by a plurality of users, the method comprising:
   estimating a feeling of a first user among the plurality of users as a subject on the basis of a physical value obtained from a sensor;
   determining, using the obtained physical value or the estimated feeling, whether to display the estimated feeling and determining whether the first user is looking at the display; and
   controlling the display for displaying, on the display seen by the plurality of users, the estimated feeling of the first user in accordance with a result of the determining whether to display the estimated feeling of the first user, wherein
   the display of the estimated feeling of the first user depends on whether the first user is determined to be looking at the display,
   if it is determined that the first user is looking at the display seen by the plurality of users, the estimated feeling is not displayed, and
   if it is determined that the first user is not looking at the display seen by the plurality of users, the estimated feeling is displayed.

2. The method according to claim 1,
   wherein, in the determining, a frequency according to the obtained physical value or the estimated feeling is set as a display frequency, and
   wherein, in the controlling, the estimated feeling is displayed at the frequency set in the determining.

3. The method according to claim 2,
   wherein, in the determining, a higher display frequency is set as intensity of the estimated feeling becomes higher.

4. The method according to claim 2,
   wherein, in the determining, it is determined whether the estimated feeling is a feeling determined in advance not to be displayed on the display screen, and
   wherein, in the controlling, the feeling determined in advance not to be displayed on the display screen is not displayed.

5. The method according to claim 2,
   wherein, in the determining, the estimated feeling is displayed in advance to the first user, and an instruction by the first user, as to whether to display the feeling displayed in advance to the first user, is received, and
   wherein, in the controlling, the display is controlled in accordance with the instruction by the first user.

6. The method according to claim 1,
   wherein, in the determining, it is determined whether or not a number of users included in an image obtained by a camera as the sensor is three or more, and
   wherein, if it is determined that the number of users included in the image is three or more, the estimated feeling is displayed.

7. The method according to claim 1,
   wherein, in the estimating, arousal, surprise, pleasure, comfort, carefreeness, drowsiness, boredom, sadness, disgust, irritation, anger, scare, or calmness is estimated as the feeling of the first user based on an image including a face of the first user obtained by a camera as the sensor.

8. The method according to claim 1,
   wherein the first user is a driver of a vehicle,
   wherein the plurality of users other than the first user are not passengers of the vehicle, and
   wherein, in the estimating, irritation or anger of the driver is estimated.

9. The method according to claim 1,
   wherein the first user is a user of a toilet,
   wherein the plurality of users other than the first user are persons outside of the toilet waiting to use the toilet, and
   wherein, in the estimating, discomfort or carefreeness of the user is estimated as the feeling of the first user.

10. The method according to claim 1,
    wherein the first user is a person outside a toilet waiting to use the toilet,
    wherein the plurality of users other than the first user are users of toilets, and
    wherein, in the estimating, discomfort or irritation of the person waiting outside the toilet is estimated.

11. The method according to claim 1,
    wherein, at least one of the estimating, the determining and the controlling is performed by a processor.

12. The method according to claim 1, wherein, if it is determined to display the estimated feeling, in the controlling, the estimated feeling is displayed on the display screen to the plurality of users other than first user who are not the subject.

13. An information display apparatus that displays information on a display screen seen by a plurality of users of the display screen, the information display apparatus comprising:
- a processor that
  - estimates a feeling of a first user among the plurality of users of the display screen as a subject based on a physical value obtained from a sensor;
  - determines, using the obtained physical value or the estimated feeling, whether to display the estimated feeling of the first user of the display screen seen by the plurality of users of the display screen and determines whether the first user is looking at the display screen; and
  - controls the display screen for displaying, on the display screen, the estimated feeling of the first user of the display screen seen by the plurality of users of the display screen in accordance with a result of the determination of whether to display the estimated feeling of the first user of the display screen seen by the plurality of users of the display screen, wherein
- the control of the display screen of the estimated feeling of the first user depends on whether the first user is determined to be looking at the display screen,
- if the processor determines that the first user is looking at the display screen seen by the plurality of users, the processor controls the display screen so as not to display the estimated feeling, and
- if the processor determines that the first user is not looking at the display screen seen by the plurality of users, the processor controls the display screen to display the estimated feeling.

14. A non-transitory recording medium storing a program for controlling a computer that displays information on a display screen seen by a plurality of users of the display screen, the program causing the computer to execute:
- estimating a feeling of a first user among the plurality of users of the display screen as a subject on the basis of a physical value obtained from a sensor;
- determining, using the obtained physical value or the estimated feeling, whether to display the estimated feeling of the first user of the display screen seen by the plurality of users of the display screen and determining whether the first user is looking at the display screen; and
- controlling the display screen for displaying, on the display screen, the estimated feeling of the first user of the display screen seen by the plurality of users of the display screen in accordance with a result of the determining of whether to display the estimated feeling of the first user of the display screen seen by the plurality of users of the display screen, wherein
- the control by the computer of the display screen to display of the estimated feeling of the first user depends on whether the first user is determined to be looking at the display screen,
- if the computer determines that the first user is looking at the display screen seen by the plurality of users, the computer controls the display screen so as not to display the estimated feeling, and
- if the computer determines that the first user is not looking at the display screen seen by the plurality of users, the computer controls the display screen to display the estimated feeling.

* * * * *